(12) United States Patent
Lee et al.

(10) Patent No.: US 12,473,382 B2
(45) Date of Patent: Nov. 18, 2025

(54) HOLOGRAM RECORDING MEDIUM AND OPTICAL ELEMENT COMPRISING THE SAME

(71) Applicant: LG CHEM, LTD., Seoul (KR)

(72) Inventors: Hanna Lee, Daejeon (KR); Min Soo Kim, Daejeon (KR); Cheol Jun Song, Daejeon (KR); Sang Pil Moon, Daejeon (KR); Yeonhui Yi, Daejeon (KR); Inkyu Lee, Daejeon (KR); Chulsuk Hong, Daejeon (KR); Hoyong Lee, Daejeon (KR); Soonhwa Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 18/867,960

(22) PCT Filed: Oct. 11, 2023

(86) PCT No.: PCT/KR2023/015579
§ 371 (c)(1),
(2) Date: Nov. 21, 2024

(87) PCT Pub. No.: WO2024/096358
PCT Pub. Date: May 10, 2024

(65) Prior Publication Data
US 2025/0320317 A1    Oct. 16, 2025

(30) Foreign Application Priority Data

Nov. 4, 2022  (KR) .................. 10-2022-0146043
Nov. 4, 2022  (KR) .................. 10-2022-0146044

(51) Int. Cl.
*G11B 7/00*    (2006.01)
*C08F 2/50*    (2006.01)
(Continued)

(52) U.S. Cl.
CPC .............. *C08F 2/50* (2013.01); *C08F 290/06* (2013.01); *G11B 7/24044* (2013.01)

(58) Field of Classification Search
CPC ........ G11B 7/0065; G11B 2007/00653; G11B 2007/00656; G11B 2220/2504;
(Continued)

(56) References Cited

U.S. PATENT DOCUMENTS

| 5,340,701 A | 8/1994 | Desobry |
| 6,096,794 A | 8/2000 | Cunningham et al. |

(Continued)

FOREIGN PATENT DOCUMENTS

| CN | 108003186 A | 5/2018 |
| CN | 110327842 A | 10/2019 |

(Continued)

OTHER PUBLICATIONS

PCT Search Report issued for PCT/KR2023/015580 on Jan. 15, 2024, 6 pages.

(Continued)

*Primary Examiner* — Nabil Z Hindi
(74) *Attorney, Agent, or Firm* — ROTHWELL, FIGG, ERNST & MANBECK, P.C.

(57) ABSTRACT

The present invention relates to a hologram recording medium and an optical element comprising the same. The hologram recording medium not only has excellent optical recording properties but also can exhibit transparent optical properties and excellent reliability even in high temperature and high humidity environments.

17 Claims, 1 Drawing Sheet

(51) Int. Cl.
*C08F 290/06* (2006.01)
*G11B 7/24044* (2013.01)

(58) Field of Classification Search
CPC ............. H04N 5/89; G03H 2260/30; G03H 2001/0264; G03H 2001/026; G03H 1/02; G03F 7/001
USPC ........................................................ 369/103
See application file for complete search history.

(56) References Cited

U.S. PATENT DOCUMENTS

| | | | |
|---|---|---|---|
| 6,989,052 | B1 | 1/2006 | Wu et al. |
| 7,781,124 | B2* | 8/2010 | Kawaguchi ............ G03H 1/02 430/1 |
| 8,722,755 | B2 | 5/2014 | Tsai et al. |
| 10,606,212 | B2 | 3/2020 | Roelle et al. |
| 2003/0005304 | A1 | 1/2003 | Lawandy et al. |
| 2003/0012562 | A1 | 1/2003 | Lawandy et al. |
| 2003/0077542 | A1 | 4/2003 | Arai et al. |
| 2004/0121268 | A1 | 6/2004 | Conroy et al. |
| 2004/0137334 | A1 | 7/2004 | Otaki et al. |
| 2005/0018595 | A1 | 1/2005 | Conroy et al. |
| 2005/0054633 | A1 | 3/2005 | Flohr et al. |
| 2006/0064594 | A1 | 3/2006 | Lawandy |
| 2007/0145735 | A1 | 6/2007 | Lawandy et al. |
| 2007/0191628 | A1 | 8/2007 | Gunther et al. |
| 2010/0028682 | A1 | 2/2010 | Shinohara |
| 2010/0266936 | A1 | 10/2010 | Otaki et al. |
| 2012/0231234 | A1 | 9/2012 | Kodama |
| 2013/0269568 | A1 | 10/2013 | Claus et al. |
| 2014/0127611 | A1 | 5/2014 | Choi et al. |
| 2014/0314677 | A1 | 10/2014 | Groves et al. |
| 2015/0045472 | A1 | 2/2015 | Yamate |
| 2015/0261938 | A1 | 9/2015 | Rölle et al. |
| 2016/0252808 | A1 | 9/2016 | Berneth et al. |
| 2016/0252812 | A1 | 9/2016 | Yamada et al. |
| 2017/0045816 | A1 | 2/2017 | Fäcke et al. |
| 2017/0121260 | A1 | 5/2017 | Friedrich et al. |
| 2017/0217863 | A1 | 8/2017 | Friedrich et al. |
| 2017/0349760 | A1 | 12/2017 | Friedrich |
| 2017/0362165 | A1 | 12/2017 | Fäcke et al. |
| 2019/0317404 | A1 | 10/2019 | Jang et al. |
| 2020/0255623 | A1 | 8/2020 | Jang et al. |
| 2020/0355996 | A1 | 11/2020 | Kim et al. |
| 2021/0003919 | A1 | 1/2021 | Kim et al. |
| 2021/0026239 | A1 | 1/2021 | Kim et al. |
| 2021/0324137 | A1 | 10/2021 | Cole et al. |
| 2021/0340302 | A1 | 11/2021 | Jang et al. |
| 2021/0340383 | A1 | 11/2021 | Friedrich |
| 2022/0013142 | A1 | 1/2022 | Igarashi et al. |
| 2023/0142827 | A1 | 5/2023 | Lee et al. |
| 2023/0258857 | A1 | 8/2023 | Kanai et al. |
| 2023/0357347 | A1 | 11/2023 | Enquist et al. |

FOREIGN PATENT DOCUMENTS

| | | |
|---|---|---|
| CN | 111247121 A | 6/2020 |
| CN | 114685698 A | 7/2022 |
| GB | 901880 A | 7/1962 |
| JP | H05-165388 A | 7/1993 |
| JP | H08-220975 A | 8/1996 |
| JP | 2002-229202 A | 8/2002 |
| JP | 2004-191919 A | 7/2004 |
| JP | 2006-342102 A | 12/2006 |
| JP | 2007-119352 A | 5/2007 |
| JP | 2008-019414 A | 1/2008 |
| JP | 2011-221192 A | 11/2011 |
| JP | 2014-026116 A | 2/2014 |
| JP | 2014-510021 A | 4/2014 |
| JP | 2014-209216 A | 11/2014 |
| JP | 2018-505927 A | 3/2018 |
| JP | 2021-535261 A | 12/2021 |
| JP | 2022-099540 A | 7/2022 |
| KR | 10-1999-0044967 A | 6/1999 |
| KR | 10-2006-0065699 A | 6/2006 |
| KR | 10-2009-0064421 A | 6/2009 |
| KR | 10-2014-0028587 A | 3/2014 |
| KR | 10-2014-0059695 A | 5/2014 |
| KR | 10-2015-0065691 A | 6/2015 |
| KR | 10-1623295 B1 | 5/2016 |
| KR | 10-2016-0072158 A | 6/2016 |
| KR | 10-2016-0149231 A | 12/2016 |
| KR | 10-2017-0040290 A | 4/2017 |
| KR | 10-1798448 B1 | 11/2017 |
| KR | 10-2019-0036473 A | 4/2019 |
| KR | 10-2019-0042469 A | 4/2019 |
| KR | 10-2020-0067127 A | 6/2020 |
| KR | 10-2156872 B1 | 9/2020 |
| KR | 10-2021-0003510 A | 1/2021 |
| KR | 10-2021-0008834 A | 1/2021 |
| KR | 10-2228538 B1 | 3/2021 |
| KR | 10-2239212 B1 | 4/2021 |
| KR | 10-2021-0102237 A | 8/2021 |
| KR | 10-2338107 B1 | 12/2021 |
| KR | 10-2372956 B1 | 3/2022 |
| KR | 10-2384288 B1 | 4/2022 |
| KR | 10-2022-0067955 A | 5/2022 |
| KR | 10-2022-0112996 A | 8/2022 |
| TW | 237456 B | 1/1995 |
| TW | 200641524 A | 12/2006 |
| TW | 201235412 A | 9/2012 |
| TW | 202110958 A | 3/2021 |
| WO | 2004-042704 A2 | 5/2004 |
| WO | 2015-124290 A1 | 8/2015 |
| WO | 2016-096129 A1 | 6/2016 |
| WO | 2019-183577 A1 | 9/2019 |

OTHER PUBLICATIONS

PCT Search Report issued for PCT/KR2023/015579 on Jan. 15, 2024, 4 pages.
PCT Search Report issued for PCT/KR2023/015584 on Jan. 15, 2024, 6 pages.
PCT Search Report issued for PCT/KR2023/015587 on Jan. 25, 2024, 4 pages.
PCT Search Report issued for PCT/KR2023/015560 on Jan. 15, 2024, 4 pages.
PCT Search Report issued for PCT/KR2023/015562 on Jan. 15, 2024, 6 pages.
Chemical abstract compound, STNext RN 1357623-76-7 (Entered STN: Feb. 27, 2012), 1 pages.
Lanning et al., "Azodicarbonyl dimorpholide (ADDM): aneffective, versatile, and water-soluble Mitsunobu reagent", Tetrahedron letters, 2013, vol. 54, pp. 4624-4628.
Chemical abstract compound, STNext RN 96237-07-9 (Entered STN: May 12, 1985), 1 pages.
Kokelenberg et al., "A New Type of Fluortensides, based on the Addition of Nucleophiles to Chlorotrifluoroethylene and Hexafluoropropylene" Tenside Surfactants Detergents, 1985, vol. 22, No. 1, pp. 22-27.
McRae et al., "Pentafluorophenyl Ester-Functionalized Phosphorylcholine Polymers: Preparation of Linear, Two-Arm, and Grafted Polymer?Protein Conjugates", Biomacromolecules, 2012, vol. 13, Issue 7, 2099-2109.
Nakhla et al., "Chemoselective Intramolecular Carbonyl Ylide Formation through Electronically Differentiated Malonate Diesters," Org. Lett. 2015, 17, 23, 5760-5763.
Thiam et al., "Designing bioinspired parahydrophobic surfaces by electrodeposition of poly (3, 4-ethylenedioxypyrrole) and poly (3, 4-propylenedioxypyrrole) with mixed hydrocarbon and fluorocarbon chains", European polymer journal, 2019, vol. 110, pp. 76-84.
Kaehler et al., "Borane promoted aryl transfer reaction for the synthesis of α-aryl functionalized β-hydroxy and β-keto esters," Org. Biomol. Chem., 2022, vol. 20, 4298-4302.
Neal O. Brace, "Reactions of 2-(perfluoroalkyl)ethane thiols with 1,6-heptadiene and 4-substituted 1,6-heptadienes: the synthesis of RFethanethio-cyclopentanoic and -dioic acids; and, "geminal-twintail" bis-(perfluoroalkylethanethio) alkanoic acids," Journal of Fluorine Chemistry, 2005, vol. 126, Issue 1, pp. 7-15.

(56) References Cited

OTHER PUBLICATIONS

O'Brien et al., "Rhodium-catalyzed arylative cyclization of alkynyl malonates by 1,4-rhodium(i) migration", Chem. Commun., 2019, 55, 11366-11369.

Mudshinge et al., "Synthesis and applications of S-(trifluoromethyl)-2,8-bis(trifluoromethoxy)dibenzothiophenium triflate (Umemoto reagent IV)", Journal of Fluorine Chemistry, 2022, 261-262, 110015, 10 pages.

Motomura et al., "Impact of Unsymmetrical Alkyl-Fluoroalkyl Side Chains over Coil-to-Rod Transition of Soluble Polyacetylenes: Modulation of Electronic Conjugation of Isolated Chains and Their Self-Assembly," Macromolecules 2019, vol. 52, 13, 4916-4925.

* cited by examiner

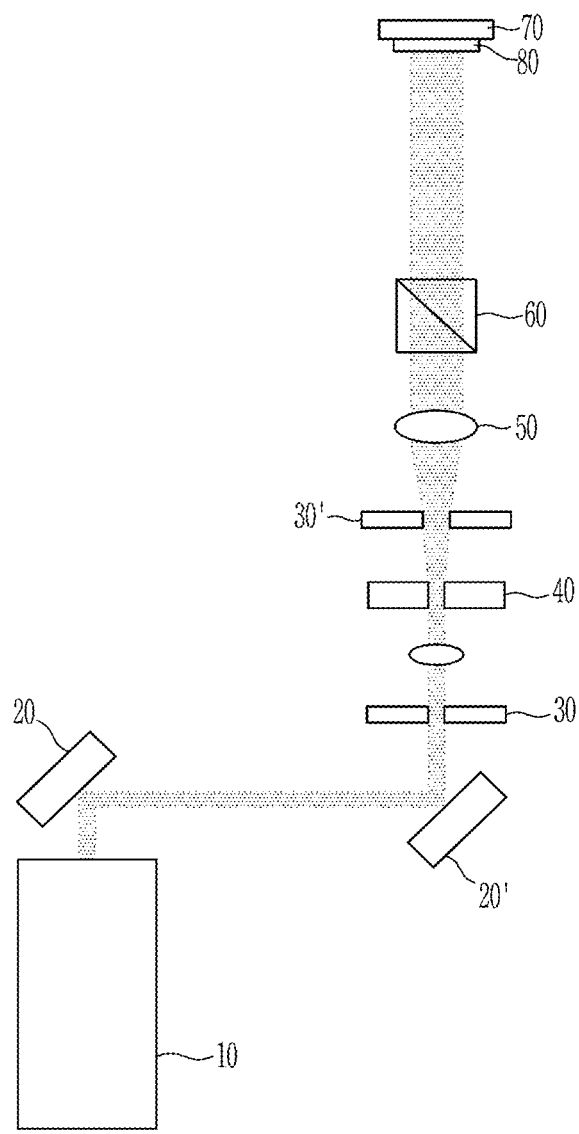

HOLOGRAM RECORDING MEDIUM AND OPTICAL ELEMENT COMPRISING THE SAME

CROSS-REFERENCE TO RELATED APPLICATION(S)

This application s a 35 U.S.C. § 371 National Phase Entry Application from PCT/KR2023/015579, filed on Oct. 11, 2023, which claims the benefit of Korean Patent Application No. 10-2022-0146043 filed on Nov. 4, 2022 and Korean Patent Application No. 10-2022-0146044 filed on Nov. 4, 2022 in the Korean Intellectual Property Office, the disclosures of which are incorporated herein by reference in their entirety.

TECHNICAL FIELD

The present invention relates to a hologram recording medium and an optical element comprising the same.

BACKGROUND

Hologram recording medium records information by changing a refractive index in the holographic recording layer in the medium through an exposure process, reads the variation of refractive index in the medium thus recorded, and reproduces the information.

In this regard, a photopolymer composition can be used for preparing a hologram. The photopolymer can easily store light interference pattern as a hologram by photopolymerization of a photoreactive monomer. Therefore, the photopolymer can be used in various fields such as, for example, smart devices such as mobile devices, wearable display parts, vehicle articles (e.g., head up display), holographic fingerprint recognition system, optical lenses, mirrors, deflecting mirrors, filters, diffusing screens, diffraction elements, light guides, waveguides, holographic optical elements having projection screen and/or mask functions, medium of optical memory system and light diffusion plate, optical wavelength multiplexers, reflection type, transmission type color filters, and the like.

Specifically, a photopolymer composition for preparing a hologram includes a polymer matrix, a photoreactive monomer, and a photoinitiator system, and the photopolymer layer prepared from such a composition is irradiated with laser interference light to induce photopolymerization of local monomers.

A refractive index modulation is generated through this local photopolymerization process, and a diffraction grating is generated by such a refractive index modulation. The refractive index modulation value ($\Delta n$) is influenced by the thickness and the diffraction efficiency (DE) of the photopolymer layer, and the angular selectivity increases as the thickness decreases.

Recently, a request for development of materials capable of maintaining a stable hologram with a high diffraction efficiency has been increased, and also various attempts have been made to prepare a photopolymer layer having high diffraction efficiency and high refractive index modulation values as well as a thin thickness.

On the other hand, when the hologram recording medium is used as an optical element in applications such as mobile devices or vehicle parts (e.g., head up displays), it is placed under high temperature and high humidity environments. In such a case, while deformation of the diffraction grating occurs, the image becomes distorted and the originally intended function may not be performed.

Therefore, there is a need to develop a photopolymer layer with less deformation of the diffraction grating and excellent reliability despite the heat and moisture of the usage environment and a hologram recording medium comprising the same.

DETAILED DESCRIPTION OF THE INVENTION

Technical Problem

According to an embodiment of the present invention, a hologram recording medium is provided.

According to another embodiment of the present invention, an optical element comprising the hologram recording medium is provided.

Technical Solution

Now, a hologram recording medium and an optical element comprising the same, and the like according to specific embodiments of the present invention will be described.

The term "hologram recording medium" as used herein means a medium (or media) on which optical information can be recorded in an entire visible range and an ultraviolet range (e.g., 300 to 1,200 nm) through an exposure process, unless specifically stated otherwise. Therefore, the hologram recording medium herein may mean a medium on which optical information is recorded, or may mean a medium before recording that is capable of recording optical information. The hologram herein may include all of visual holograms such as in-line (Gabor) holograms, off-axis holograms, full-aperture transfer holograms, white light transmission holograms ("rainbow holograms"), Denisyuk holograms, off-axis reflection holograms, edge-lit holograms or holographic stereograms.

In this specification, in relation to environmental conditions, etc. under which a hologram recording medium or a device including the same is placed, "high temperature" may mean a temperature of 60° C. or more. For example, the high temperature may mean a temperature of 65° C. or more, 70° C. or more, 75° C. or more, 80° C. or more, 85° C. or more, or 90° C. or more, and the upper limit thereof is not particularly limited, but may be, for example, 110° C. or less, 105° C. or less, 100° C. or less, 95° C. or less, 90° C. or less, 85° C. or less, or 80° C. or less. When temperature affects the characteristics of a material, object, or component, unless temperature is specifically mentioned otherwise, the temperature condition under which the characteristic is measured or explained may mean a room temperature (e.g., a temperature in the range of about 15 to 30° C. which is a temperature without heating or cooling).

Further, in this specification, with regard to environmental conditions, etc. under which a hologram recording medium or a device including the same is placed, "high humidity" may mean a relative humidity of 80% or more. For example, high humidity conditions may mean conditions that satisfy a relative humidity of 85% or more, 90% or more, or 95% or more. When humidity affects the characteristics of a material, object, or component, unless specifically stated otherwise, the humidity conditions under which the characteristics are measured or explained is a case where the relative humidity is lower than the high humidity condition, For example, it may be a relative humidity condition in the range of 15% or more and less than 80%, and specifically, it refers to relative humidity conditions where the lower limit is 20% or more, 25% or more, 30% or more, 35% or more, and 40% or more, and the upper limit is 75% or less, 70% or less, 65% or less, or 60% or less.

Further, in this specification, high temperature/high humidity conditions may mean environmental conditions that satisfy at least one of the high temperature conditions and high humidity conditions described above.

According to one embodiment of the invention, there is provided a hologram recording medium comprising: a photopolymer layer which includes a polymer matrix formed by crosslinking a siloxane-based polymer containing a silane functional group and a (meth)acrylic-based polyol, or a precursor thereof; a photoreactive monomer and a photoinitiator system or a photopolymer obtained therefrom; and a fluorinated compound, wherein a refractive index variation calculated by the following Equation 4 is 1.0% or less, and wherein a haze is 2% or less.

$$\text{Refractive index variation (\%)} = \{|1 - n_1/n_0|\} \times 100 \quad \text{[Equation 4]}$$

wherein, in Equation 4, no is the refractive index of a sample in which the hologram recording medium before recording is stored at a temperature of 20 to 25° C. and a relative humidity of 40 to 50% and then bleached with a white LED, and $n_1$ is the refractive index of a sample in which the hologram recording medium before recording is stored at a temperature of 60° C. and a relative humidity of 90% for 72 hours and then bleached with a white LED.

The present inventors have found that when a specific photopolymer layer is included, it is possible to provide a hologram recording medium that not only exhibits improved optical recording properties but also exhibits highly reliable and highly transparent optical properties even in a high temperature/high humidity environment, and completed the present invention.

A hologram recording medium and an optical element including the hologram recording medium according to an embodiment of the present invention will be described in detail below.

The hologram recording medium of one embodiment of the invention includes a photopolymer layer which includes a polymer matrix formed by crosslinking a siloxane-based polymer containing a silane functional group and a (meth) acrylic-based polyol, or a precursor thereof; a photoreactive monomer and a photoinitiator system or a photopolymer obtained therefrom; and a fluorinated compound.

The photopolymer layer may be a photopolymer layer in the state before recording that is capable of recording optical information, or may be a photopolymer layer in the state in which optical information is recorded.

A photopolymer layer on which optical information is recorded can be prepared by irradiating an object light and a reference light onto the photopolymer layer before recording. When an object light and a reference light are radiated onto the photopolymer layer before recording, due to the interference field between the object light and the reference light, the photoinitiator system is present in an inactive state in the destructive interference region, and photopolymerization of the photoreactive monomer does not occur, and in the constructive interference region, photopolymerization of the photoreactive monomer occurs due to the activated photoinitiator system. As the photoreactive monomer is continuously consumed in the constructive interference region, a concentration difference occurs between the photoreactive monomer in the destructive interference region and the constructive interference region. As a result, the photoreactive monomer in the destructive interference region diffuses into the constructive interference region. At this time, the fluorinated compound, which is a plasticizer, moves in the opposite direction to the photoreactive monomer. Since the photoreactive monomer and the photopolymer formed therefrom have a high refractive index compared to the polymer matrix and the fluorinated compound, a spatial change in the refractive index occurs in the photopolymer layer, and a grating is generated by the spatial refractive index modulation occurring in the photopolymer layer. Such a grating surface plays the role of a reflective surface that reflects incident light due to the difference in refractive index. When light having the wavelength at the time of recording is incident in the direction of the reference light after recording the hologram, it satisfies the Bragg condition and the light diffracts in the direction of the original object light, which makes it reproduce holographic optical information.

Therefore, if the photopolymer layer is in a state before recording, the photopolymer layer may include a photoreactive monomer, a photoinitiator and a fluorinated compound in a randomly dispersed form within the polymer matrix or its precursor.

On the other hand, if optical information is recorded on the photopolymer layer, the photopolymer layer may include a polymer matrix, a photopolymer distributed to form a grating and a fluorinated compound.

The photopolymer layer is formed from a photopolymer composition which includes a polymer matrix formed by crosslinking a siloxane-based polymer containing a silane functional group and a (meth)acrylic-based polyol, or a precursor thereof; a photoreactive monomer and a photoinitiator system; and a fluorinated compound.

The polymer matrix serves as a support for the photopolymer layer, and is formed by crosslinking a siloxane-based polymer containing a silane functional group (Si—H) and a (meth)acrylic-based polyol. Specifically, the polymer matrix is formed by crosslinking (meth)acrylic-based polyol with a siloxane-based polymer containing a silane functional group. More specifically, the hydroxy group of the (meth) acrylic-based polyol can form a crosslink with the silane functional group of the siloxane-based polymer through a hydrosilylation reaction. The hydrosilylation reaction can proceed rapidly under a Pt-based catalyst even at room temperature (e.g., a temperature in the range of about 15 to 30° C. which is a temperature without heating or cooling). Therefore, the hologram recording medium according to one embodiment of the invention employs a polymer matrix that can be quickly crosslinked even at room temperature as a support, thereby being able to improve the preparation efficiency and productivity.

The polymer matrix can enhance the mobility of components (e.g., photoreactive monomer or plasticizer, etc.) contained in the photopolymer layer due to the flexible main chain of the siloxane-based polymer. In addition, siloxane bonding having excellent heat resistance and moist heat resistance properties can facilitate ensuring reliability of the photopolymer layer in which optical information is recorded, and of the hologram recording medium including the same.

The polymer matrix may have a relatively low refractive index, which can serve to enhance the refractive index modulation of the photopolymer layer. For example, the upper limit of the refractive index of the polymer matrix may be 1.53 or less, 1.52 or less, 1.51 or less, 1.50 or less, or 1.49 or less. And, the lower limit of the refractive index of the polymer matrix may be, for example, 1.40 or more, 1.41 or more, 1.42 or more, 1.43 or more, 1.44 or more, 1.45 or more, or 1.46 or more. As used herein, "refractive index" may be a value measured with an Abbe refractometer at 25° C.

The photopolymer layer may include the polymer matrix in crosslinked form as described above, or may include a precursor thereof. When the photopolymer layer includes a precursor of the polymer matrix, it may include a siloxane-based polymer, a (meth)acrylic-based polyol, and a Pt-based catalyst.

The siloxane-based polymer may include, for example, a repeating unit represented by the following Chemical Formula 1 and a terminal end group represented by the following Chemical Formula 2.

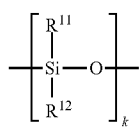

[Chemical Formula 1]

wherein, in Chemical Formula 1,
a plurality of $R^{11}$ and $R^{12}$ are the same or different from each other, and are each independently hydrogen, halogen, or an alkyl group having 1 to 10 carbon atoms, and
k is an integer of 1 to 10,000,

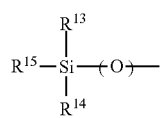

[Chemical Formula 2]

wherein, in Chemical Formula 2,
a plurality of $R^{13}$ to $R^5$ are the same or different from each other, and are each independently hydrogen, halogen, or an alkyl group having 1 to 10 carbon atoms, and
at least one of $R^{11}$ to $R^{15}$ of at least one repeating unit selected among the repeating units represented by Chemical Formula 1 and any one terminal end group selected among the terminal end groups represented by Chemical Formula 2 is hydrogen.

In Chemical Formula 2, —(O)— means either bonding through oxygen(O) or directly bonding without oxygen(O) when Si of the terminal end group represented by Chemical Formula 2 is bonded to the repeating unit represented by Chemical Formula 1.

As used herein, "alkyl group" may be a straight chain, branched chain, or cyclic alkyl group. By way of non-limiting example, "alkyl group" as used herein may be methyl, ethyl, propyl (e.g. n-propyl, isopropyl, etc.), butyl (e.g., n-butyl, isobutyl, tert-butyl, sec-butyl, cyclobutyl, etc.), pentyl (e.g., n-pentyl, isopentyl, neopentyl, tert-pentyl, 1,1-dimethyl-propyl, 1-ethyl-propyl, 1-methyl-butyl, cyclo-pentyl, etc.), hexyl (e.g., n-hexyl, 1-methylpentyl, 2-methylpentyl, 4-methylpentyl, 3,3-dimethylbutyl, 1-ethyl-butyl, 2-ethylbutyl, cyclopentylmethyl, cyclohexyl, etc.), heptyl (e.g., n-heptyl, 1-methylhexyl, 4-methylhexyl, 5-methylhexyl, cyclohexylmethyl, etc.), octyl (e.g., n-octyl, tert-octyl, 1-methylheptyl, 2-ethylhexyl, 2-propylpentyl, etc.), nonyl (e.g., n-nonyl, 2,2-dimethylheptyl, etc.), and the like.

In one example, $R^{11}$ to $R^{15}$ in Chemical Formulas 1 and 2 are methyl or hydrogen, and at least two of $R^{11}$ to $R^{15}$ may be hydrogen. More specifically, the siloxane-based polymer may be a compound in which $R^{11}$ and $R^{12}$ of Chemical Formula 1 are each independently methyl and hydrogen, and $R^{13}$ to $R^{15}$ of Chemical Formula 2 are each independently methyl or hydrogen (e.g., polymethylhydrosiloxane whose terminal end group is a trimethylsilyl group or a dimethylhydrosilyl group); a compound in which some $R^{11}$ and $R^{12}$ of Chemical Formula 1 are methyl and hydrogen, respectively, both the remaining $R^{11}$ and $R^{12}$ are methyl, and $R^{13}$ to $R^{15}$ of Chemical Formula 2 are each independently methyl or hydrogen (e.g., poly(dimethylsiloxane-co-methylhydrosiloxane) whose terminal end group is a trimethylsilyl group or a dimethylhydrosilyl group); or a compound in which both $R^{11}$ and $R^{12}$ of Chemical Formula 1 are methyl, at least one of $R^{13}$ to $R^{15}$ of Chemical Formula 2 is hydrogen, and the remainder are each independently methyl or hydrogen (e.g., polydimethylsiloxane in which either or both of the terminal end groups are dimethylhydrosilyl groups).

The siloxane-based polymer may have a number average molecular weight (Mn) in the range of 200 to 4,000 as an example. Specifically, the lower limit of the number average molecular weight of the siloxane-based polymer may be, for example, 200 or more, 250 or more, 300 or more, or 350 or more, and the upper limit thereof may be, for example, 3,500 or less, 3,000 or less, 2,500 or less, 2,000 or less, 1,500 or less, or 1,000 or less. When the number average molecular weight of the siloxane-based polymer satisfies the above range, it is possible to prevent the problems that during the crosslinking process with (meth)acrylic-based polyol which is performed at room temperature or higher, the siloxane-based polymer volatilizes and the degree of matrix crosslinking decreases, or the siloxane-based polymer has poor compatibility with other components of the photopolymer composition and thus, phase separation occurs between the components, thereby allowing the hologram recording medium formed from the photopolymer composition to exhibit excellent optical recording properties and excellent durability under high temperature/high humidity conditions.

The number average molecular weight means a number average molecular weight (unit: g/mol) in terms of polystyrene determined by GPC method. In the process of determining the number average molecular weight in terms of polystyrene measured by the GPC method, a commonly known analyzing device, a detector such as a refractive index detector, and an analytical column can be used, and commonly applied conditions for temperature, solvent, and flow rate can be used. Specific examples of the measurement conditions may include a temperature of 25° C., tetrahydrofuran solvent and a flow rate of 1 mL/min.

The (meth)acrylic-based polyol may mean a polymer in which one or more, specifically two or more, hydroxy groups are bonded to the main chain or side chain of a (meth)acrylate-based polymer. Unless specifically stated otherwise, "(meth)acrylic (based)" as used herein refers to acrylic (based) and/or methacrylic (based), which is a term that encompasses all of acrylic (based), methacrylic (based), or a mixture of acrylic (based) and methacrylic (based).

The (meth)acrylic-based polyol is a homopolymer of a (meth)acrylate-based monomer having a hydroxy group, a copolymer of two or more types of (meth)acrylate-based monomers having a hydroxy group, or a copolymer of a (meth)acrylate-based monomer having a hydroxy group and a (meth)acrylate-based monomer having no hydroxy group. As used herein. "copolymer" is a term that encompasses all of a random copolymer, a block copolymer and a graft copolymer, unless otherwise specified.

The (meth)acrylate-based monomer having a hydroxy group may include, for example, hydroxyalkyl (meth)acrylate, hydroxyaryl (meth)acrylate, or the like, the alkyl is an alkyl having 1 to 30 carbon atoms, and the aryl may be an aryl having 6 to 30 carbon atoms. Further, the (meth)acrylate-based monomer having no hydroxy group may include, for example, an alkyl (meth)acrylate-based monomer, an aryl (meth)acrylate-based monomer, or the like, the alkyl may be an alkyl having 1 to 30 carbon atoms, and the aryl may be an aryl having 6 to 30 carbon atoms.

The (meth)acrylic-based polyol may have a weight average molecular weight (Mw) in the range of 150,000 to 1,000,000 as an example. The weight average molecular weight means a weight average molecular weight in terms of polystyrene measured by the GPC method as described above. For example, the lower limit of the weight average molecular weight may be 150,000 or more, 200,000 or more, or 250,000 or more, and the upper limit thereof may be, for example, 900,000 or less, 850,000 or less, 800,000 or less, 750,000 or less, 700,000 or less, 650,000 or less, 600,000 or less, 550,000 or less, 500,000 or less, or 450,000 or less. When the weight average molecular weight of the (meth)acrylic-based polyol satisfies the above range, the polymer matrix sufficiently exerts the function as a support and thus, the recording properties for optical information less decrease even after the usage time has passed, and sufficient flexibility is imparted to the polymer matrix, thereby being able to improve the mobility of components (e.g., photoreactive monomer or plasticizer, etc.) contained in the photopolymer composition, and minimize the decrease in recording properties for optical information.

In order to adjust the crosslinking density of the (meth)acrylic-based polyol by the siloxane-based polymer at a level that is advantageous for ensuring the function of the hologram recording medium, the hydroxyl equivalent of the (meth)acrylic-based polyol may be adjusted to an appropriate level.

Specifically, the hydroxyl (—OH) equivalent of the (meth)acrylic-based polyol may be, for example, in the range of 500 to 3,000 g/equivalent. More specifically, the lower limit of the hydroxyl group (—OH) equivalent of the (meth)acrylic-based polyol may be 600 g/equivalent or more, 700 g/equivalent or more, 800 g/equivalent or more, 900 g/equivalent or more, 1000 g/equivalent or more, 1100 g/equivalent or more, 1200 g/equivalent or more, 1300 g/equivalent or more, 1400 g/equivalent or more, 1500 g/equivalent or more, 1600 g/equivalent or more, 1700 g/equivalent or more, or 1750 g/equivalent or more. And, the upper limit of the hydroxyl group (—OH) equivalent of the (meth)acrylic-based polyol may be 2900 g/equivalent or less, 2800 g/equivalent or less, 2700 g/equivalent or less, 2600 g/equivalent or less, 2500 g/equivalent or less, 2400 g/equivalent or less, 2300 g/equivalent or less, 2200 g/equivalent or less, 2100 g/equivalent or less, 2000 g/equivalent or less, or 1900 g/equivalent or less. The hydroxyl (—OH) equivalent of the (meth)acrylic-based polyol is the equivalent (g/equivalent) of one hydroxy functional group, which is the value obtained by dividing the weight average molecular weight of the (meth)acrylic-based polyol by the number of hydroxy functional groups per molecule. As the equivalent value is smaller, the functional group density is higher, and as the equivalent value is larger, the functional group density is smaller. When the hydroxyl (—OH) equivalent of the (meth)acrylic-based polyol satisfies the above range, the polymer matrix has an appropriate crosslinking density and thus, sufficiently performs the role of a support, and the mobility of the components included in the photopolymer layer is improved, which allows the initial refractive index modulation value to be maintained at an excellent level even as time passes without the problem of collapsing the boundary surfaces of the diffraction gratings generated after recording, thereby minimizing the decrease in recording properties for optical information.

For example, the (meth)acrylic-based polyol may have a glass transition temperature (Tg) in the range of −60 to −10° C. Specifically, the lower limit of the glass transition temperature may be, for example, −55° C. or more, −50° C. or more, −45° C. or more, −40° C. or more, −35° C. or more, −30° C. or more, or −25° C. or more, and the upper limit thereof may be, for example, −15° C. or less, −20° C. or less, −25° C. or less, −30° C. or less, or −35° C. or less. If the above glass transition temperature range is satisfied, it is possible to lower the glass transition temperature without significantly reducing the modulus of the polymer matrix, thereby increasing the mobility (fluidity) of other components in the photopolymer composition, and also improving the moldability of the photopolymer composition. The glass transition temperature can be measured using a known method, for example, DSC (Differential Scanning Calorimetry) or DMA (dynamic mechanical analysis).

The refractive index of the (meth)acrylic-based polyol may be, for example, 1.40 or more and less than 1.50. Specifically, the lower limit of the refractive index of the (meth)acrylic-based polyol may be, for example, 1.41 or more, 1.42 or more, 1.43 or more, 1.44 or more, 1.45 or more, or 1.46 or more, and the upper limit thereof may be, for example, 1.49 or less, 1.48 or less, 1.47 or less, 1.46 or less, or 1.45 or less. When the (meth)acrylic-based polyol has a refractive index within the above-mentioned range, it can contribute to increasing the refractive index modulation. The refractive index of the (meth)acrylic-based polyol is a theoretical refractive index, and can be calculated using the refractive index (value measured using an Abbe refractometer at 25° C.) of the monomer used for preparing the (meth)acrylic-based polyol and the fraction (molar ratio) of each monomer.

The (meth)acrylic-based polyol and siloxane-based polymer may be used so that the molar ratio (SiH/OH) of the silane functional group (Si—H) of the siloxane-based polymer to the hydroxyl group (—OH) of the (meth)acrylic-based polyol is 0.80 to 3.5. That is, the type and content of the siloxane-based polymer and the (meth)acrylic-based polyol can be selected so as to satisfy the molar ratio when forming the polymer matrix. The lower limit of the molar ratio (SiH/OH) may be, for example, 0.81 or more, 0.85 or more, 0.90 or more, 0.95 or more, 1.00 or more, or 1.05 or more, and the upper limit thereof may be, for example, 3.4 or less, 3.3 or less, 3.2 or less, 3.1 or less, 3.05 or less, or 3.0 or less. When satisfying the above molar ratio (SiH/OH) range, the polymer matrix is crosslinked at an appropriate crosslinking density, so that reliability under high temperature/high humidity conditions is improved, and a sufficient refractive index modulation value can be realized.

The Pt-based catalyst may be, for example, Karstedt's catalyst, and the like. The precursor of the polymer matrix may optionally further include rhodium-based catalysts, iridium-based catalysts, rhenium-based catalysts, molybdenum-based catalysts, iron-based catalysts, nickel-based catalysts, alkali metal or alkaline earth metal-based catalysts, Lewis acids-based or carbene-based non-metallic catalysts, in addition to the Pt-based catalyst.

On the other hand, the photoreactive monomer may include a compound having a higher refractive index than the polymer matrix in order to realize the above-described refractive index modulation. However, all photoreactive monomers included in the photopolymer composition are not limited to those having a higher refractive index than the polymer matrix, and at least a part of the photoreactive monomers may have a higher refractive index than the polymer matrix, so as to realize a high refractive index modulation value. In one example, the photoreactive monomer may include a monomer having a refractive index of 1.50 or more, 1.51 or more, 1.52 or more, 1.53 or more, 1.54 or more, 1.55 or more, 1.56 or more, 1.57 or more, 1.58 or more, 1.59 or more, or 1.60 or more, and 1.70 or less.

The photoreactive monomer may include at least one monomer selected from the group consisting of a monofunctional monomer having one photoreactive functional group and a polyfunctional monomer having two or more photoreactive functional groups. Wherein, the photoreactive functional group may be, for example, a (meth)acryloyl group, a vinyl group, a thiol group, or the like. More specifically, the photoreactive functional group may be a (meth)acryloyl group.

The monofunctional monomer may include, for example, at least one selected from the group consisting of benzyl (meth)acrylate (M1182 having a refractive index of 1.5140, Miwon Specialty Chemical), benzyl 2-phenylacrylate, phenoxybenzyl (meth)acrylate (M1122 having a refractive index of 1.565, Miwon Specialty Chemical), phenol (ethylene oxide) (meth)acrylate (phenol (EO) (meth)acrylate; M140 having a refractive index of 1.516, Miwon Specialty Chemical), phenol (ethylene oxide)$_2$ (meth)acrylate (phenol (EO)$_2$ (meth)acrylate; M142 having a refractive index of 1.510, Miwon Specialty Chemical), O-phenylphenol (ethylene oxide) (meth)acrylate (O-phenylphenol (EO) (meth) acrylate; M1142 having a refractive index of 1.577, Miwon Specialty Chemical), phenylthioethyl (meth)acrylate (M1162 having a refractive index of 1.560, Miwon Specialty Chemical) and biphenylmethyl (meth)acrylate.

The polyfunctional monomer may include, for example, at least one selected from the group consisting of bisphenol A (ethylene oxide)$_{2-10}$ di(meth)acrylate (bisphenol A (EO)$_{2-10}$ (meth)acrylate; M240 having a refractive index of 1.537, M241 having a refractive index of 1.529, M244 having a refractive index of 1.545, M245 having a refractive index of 1.537, M249 having a refractive index of 1.542, M2100 having a refractive index of 1.516, M2101 having a refractive index of 1.512, Miwon Specialty Chemical), bisphenol A epoxy di(meth)acrylate (PE210 having a refractive index of 1.557, PE2120A having a refractive index of 1.533, PE2120B having a refractive index of 1.534, PE2020C having a refractive index of 1.539, PE2120S having a refractive index of 1.556, Miwon Specialty Chemical), bisfluorene di(meth)acrylate (HR6022 having a refractive index of 1.600, HR6040 having a refractive index of 1.600, HR6042 having a refractive index of 1.600, Miwon Specialty Chemical), modified bisphenol fluorene di(meth)acrylate (HR 6060 having a refractive index of 1.584, HR6100 having a refractive index of 1.562, HR6200 having a refractive index of 1.530, Miwon Specialty Chemical), tris(2-hydroxyethyl)isocyanurate tri(meth)acrylate (M370 having a refractive index of 1.508, Miwon Specialty Chemical), phenol novolac epoxy (meth)acrylate (SC6300 having a refractive index of 1.525, Miwon Specialty Chemical) and cresol novolac epoxy (meth)acrylate (SC6400 having a refractive index of 1.522, SC6400C having a refractive index of 1.522, Miwon Specialty Chemical).

The photopolymer layer may contain a photoreactive monomer in an amount of 50 to 300 parts by weight based on 100 parts by weight of the polymer matrix. For example, the lower limit of the content of the photoreactive monomer may be 50 parts by weight or more, 60 parts by weight or more, 70 parts by weight or more, 80 parts by weight or more, or 90 parts by weight or more, and the upper limit thereof may be 300 parts by weight or less, 280 parts by weight or less, 250 parts by weight or less, 220 parts by weight or less, 200 parts by weight or less, 190 parts by weight or less, or 180 parts by weight or less. When the above range is satisfied, it is advantageous for ensuring excellent optical recording properties and durability in a high temperature/high humidity environment.

The content of the polymer matrix herein means the total content (weight) of the (meth)acrylic-based polyol and siloxane-based polymer forming the matrix. In other words, the content of the polymer matrix means including both the content of the polymer matrix formed by crosslinking (meth) acrylic-based polyol and siloxane-based polymer and the content of the polymer matrix precursor that is not partially crosslinked.

The photopolymer layer includes a photoinitiator system. The photoinitiator system may mean a photoinitiator that enables polymerization to initiate by light, or a combination of a photosensitizer and a coinitiator.

The photopolymer layer may include a photosensitizer and a coinitiator as a photoinitiator system.

As the photosensitizer, for example, a photosensitizing dye can be used. Specifically, the photosensitizing dye may include, for example, at least one selected from the group consisting of a silicon rhodamine compound, a sulfonium derivative of ceramidonine, new methylene blue, thioerythrosine triethylammonium, 6-acetylamino-2-methylceramidonin, eosin, erythrosine, rose bengal, thionine, basic yellow, Pinacyanol chloride, rhodamine 6G, gallocyanine, ethyl violet, Victoria blue R, Celestine blue, Quinaldine Red, crystal violet, Brilliant Green, Astrazon orange G, darrow red, pyronin Y, basic red 29, pyrylium I (pyrylium iodide), Safranin 0, cyanine, methylene blue, Azure A, and BODIPY.

In one example, as the photosensitizing dye, cyanine dyes Cy3 and Cy5 (H-Nu 640, Spectra Group Limited) can be used, or Safranin O can be used.

The photopolymer layer may contain the photosensitizing dye in the range of 0.01 to 10 parts by weight based on 100 parts by weight of the polymer matrix. Specifically, the lower limit of the content of the photosensitizing dye may be, for example, 0.05 parts by weight or more, 0.07 parts by weight or more, or 0.10 parts by weight or more, and the upper limit thereof may be, for example, 5 parts by weight or less. When the above range is satisfied, it is advantageous for exhibiting an appropriate polymerization reaction rate and ensuring desired optical recording properties.

The coinitiator may be an electron donor, an electron acceptor, or a mixture thereof.

In one example, the photopolymer layer may include an electron donor as a coinitiator. The electron donor may include, for example, a borate anion represented by the following Chemical Formula 3.

[Chemical Formula 3]

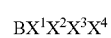

wherein, in Chemical Formula 3, $X^1$ to $X^4$ are each independently an alkyl group having 1 to 20 carbon atoms, an alkenyl group having 2 to 20 carbon atoms, an aryl group having 6 to 30 carbon atoms, an arylalkyl group having 7 to 30 carbon atoms, an alkylaryl group having 7 to 30 carbon atoms, or an allyl group, each of which is substituted or unsubstituted, with the proviso that at least one of $X^1$ to $X^4$ is not an aryl group.

When an alkyl group having 1 to 20 carbon atoms, an alkenyl group having 2 to 20 carbon atoms, an aryl group having 6 to 30 carbon atoms, an arylalkyl group having 7 to 30 carbon atoms, an alkylaryl group having 7 to 30 carbon atoms, or an allyl group is substituted, it may be substituted with at least one selected from the group consisting of halogen and an alkoxy groups having 1 to 5 carbon atoms.

Specifically, $X^1$ to $X^3$ may be each independently methyl, ethyl, propyl, n-butyl, n-pentyl, n-hexyl, cyclobutyl, cyclopentyl, cyclohexyl, ethenyl, propenyl, phenyl, methylphenyl, methoxyphenyl, naphthyl, methylnaphthyl or methoxynaphthyl, which is substituted or unsubstituted with halogen, and $X^4$ may be n-butyl, n-pentyl or n-hexyl. More specifically, the borate anion represented by Chemical Formula 3 may be, for example, a triphenylbutyl borate anion.

The cation bonded with a borate anion is one that does not absorb light, and may be an alkali metal cation or a quaternary ammonium cation. The quaternary ammonium cation means an ammonium cation in which nitrogen(N) is substituted with four substituents, wherein the four substituents are each independently an alkyl group having 1 to 40 carbon atoms, an aryl group having 6 to 30 carbon atoms, an arylalkyl group having 6 to 40 carbon atoms, or an alkyl group having 2 to 40 carbon atoms linked through an ester bond (e.g., —$CH_2CH_2$—O—CO—$CH_2CH_2CH_3$, etc.).

As the electron donor, for example, commercially available butyryl choline triphenylbutylborate (Borate V, manufactured by Spectra Group) can be used.

In one example, the photopolymer layer may include an electron acceptor as a coinitiator. The electron acceptor may include, for example, an onium salt such as a sulfonium salt, an iodonium salt, or a mixture thereof.

In one example, the electron acceptor may include an iodonium salt. As the electron acceptor, for example, commercially available H-Nu 254 (Spectra Group) can be used.

The photopolymer layer may include the coinitiator in the range of 0.05 to 10 parts by weight based on 100 parts by weight of the polymer matrix. Specifically, the lower limit of the content of the coinitiator may be, for example, 0.1 part by weight or more, 0.2 part by weight or more, 0.3 part by weight or more, 0.4 part by weight or more, or 0.5 part by weight or more, and the upper limit thereof may be, for example, 5 parts by weight or less. When the above range is satisfied, it is advantageous for exhibiting an appropriate polymerization reaction rate and ensuring the desired optical recording properties.

The photoinitiator system may include an additional photoinitiator in order to remove the color of the photosensitizing dye and react all unreacted photoreactive monomers after light irradiation for recording. The photoinitiator may include, for example, imidazole derivatives, bisimidazole derivatives, N-aryl glycine derivatives, organic azide compounds, titanocene, aluminate complex, organic peroxide, N-alkoxy pyridinium salt, thioxanthone derivatives, amine derivatives, diazonium salt, sulfonium salt, iodonium salt, sulfonic acid ester, imide sulfonate, dialkyl-4-hydroxy sulfonium salt, aryl sulfonic acid-p-nitrobenzyl ester, silanol-aluminum complex, (96-benzene) (95-cyclopentadienyl) iron(II), benzoin tosylate, 2,5-dinitro benzyl tosylate, N-tosylphthalic acid imide or mixtures thereof, etc. More specifically, the photoinitiator may include 1,3-di(t-butyldi-oxycarbonyl)benzophenone, 3,3',4,4"-tetrakis(t-butyldioxycarbonyl)benzophenone, 3-phenyl-5-isoxazolone, 2-mercapto benzimidazole, bis(2,4,5-triphenyl)imidazole, 2,2-dimethoxy-1,2-diphenylethane-1-one (product name: Irgacure 651/manufacturer: BASF), 1-hydroxy-cyclohexyl-phenyl-ketone (product name: Irgacure 184/Manufacturer: BASF), 2-benzyl-2-dimethylamino-1-(4-morpholinophenyl)-butanone-1 (product name: Irgacure 369/Manufacturer: BASF), bis(95-2,4-cyclopentadiene-1-yl)-bis(2,6-difluoro-3-(1H-pyrrole-1-yl)-phenyl)titanium (product name: Irgacure 784/Manufacturer: BASF), Ebecryl P-115 (manufacturer: SK Entis), Cyracure UVI-6970, Cyracure UVI-6974, Cyracure UVI-6990 (manufacturer: Dow Chemical Co. in USA), Irgacure 264, Irgacure 250 (manufacturer: BASF), CIT-1682 (manufacturer: Nippon Soda) or mixtures thereof, but are not limited thereto.

The photopolymer layer includes a fluorinated compound as a plasticizer.

The plasticizer enables refractive index modulation to realize more easily during the preparation of a hologram recording medium. More specifically, the plasticizer lowers the glass transition temperature of the polymeric matrix, improve the mobility of the photoreactive monomer, and have low refractive index and non-reactive properties. Thus, when a photoreactive monomer that is uniformly distributed within the polymeric matrix but is not photopolymerized moves, it can move in the direction opposite thereto and contribute to the refractive index modulation. Further, the plasticizer can also contribute to improving the moldability of photopolymer compositions.

The fluorinated compound may have a low refractive index of 1.45 or less in order to perform the above-described plasticizer function. Specifically, the upper limit of the refractive index may be, for example, 1.44 or less, 1.43 or less, 1.42 or less, 1.41 or less, 1.40 or less, 1.39 or less, 1.38 or less, or 1.37 or less, and the lower limit of the refractive index may be, for example, 1.30 or more, 1.31 or more, 1.32 or more, 1.33 or more, 1.34 or more, or 1.35 or more. Since a fluorinated compound having a lower refractive index than the above-mentioned photoreactive monomer is used, the refractive index of the polymer matrix can be further lowered, and the refractive index modulation with the photoreactive monomer can be made larger.

As the photopolymer layer includes the fluorinated compound represented by the following Chemical Formula 4, it is possible to provide a hologram recording medium having excellent optical recording properties as well as excellent reliability and high transparency even in a high temperature/high humidity environment.

[Chemical Formula 4]

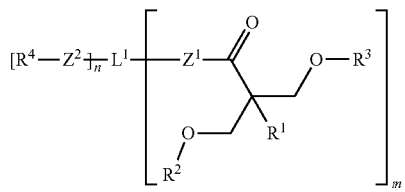

wherein, in Chemical Formula 4, $Z^1$ is —O— or —NH—, $Z^2$ is a single bond, —O— or —NH—, $L^1$ is a single bond or a divalent to hexavalent organic group in which hydroxy groups have been removed from a polyol having 2 to 6 hydroxyl groups, n and m are each independently an integer of 1 to 5, wherein the sum of n and m is 2 to 6, $R^1$ is a methyl group or an ethyl group, and at least one of $R^2$ to $R^4$ is a fluorine-containing substituent, which is an alkyl group having 1 to 20 carbon atoms substituted with 2 or more fluorines, a cycloalkyl group having 3 to 30 carbon atoms substituted with 2 or more fluorines, or an aryl group having 6 to 30 carbon atoms substituted with 2 or more fluorines, when $R^2$ and $R^3$ are not fluorine-containing substituents, they are each independently hydrogen, an alkyl group having 1 to 20 carbon atoms, a cycloalkyl group having 3 to 30 carbon atoms, a heterocycloalkyl group having 4 to 30 carbon atoms, a cycloalkylalkyl group having 7 to 40 carbon atoms, an aryl group having 6 to 30 carbon atoms, a heteroaryl group having 4 to 30 carbon atoms or an arylalkyl group having 7 to 40 carbon atoms, or a substituent in which at least one —CH$_2$— of the above substituents is substituted with —O—, —S— or —NH—, and when $R^4$ is not a fluorine-containing substituent, it is an alkyl group having 2 to 20 carbon atoms, a cycloalkyl group having 3 to 30 carbon atoms, a cycloalkylalkyl group having 7 to 40 carbon atoms, an aryl group having 6 to 30 carbon atoms, a heteroaryl group having 4 to 30 carbon atoms or an arylalkyl group having 7 to 40 carbon atoms, or is a substituent in which at least one —CH$_2$— of the above substituents is substituted with —O—, —S—, or —NH—.

More specifically, the fluorinated compound represented by Chemical Formula 4 exhibits sufficient low refractive index and thus, can sufficiently perform the role of a basic plasticizer to increase refractive index modulation with the photoreactive monomer, and improve the dispersibility of components in the photopolymer composition. In addition, the fluorinated compound represented by Chemical Formula 4 has less migration to the surface of the photopolymer layer even in high temperature and high humidity environments, is resistant against heat and moisture, and does not decompose easily even under high temperature/high humidity conditions, thereby being able to improve reliability in high-temperature/high-humidity environments. Further, the fluorinated compound represented by Chemical Formula 4 exhibits excellent compatibility with a component having a high refractive index, and can ensure highly transparent optical properties due to excellent moist heat resistance.

In Chemical Formula 4, $L^1$ connects the moiety containing a carbonyl group and the moiety containing $R^4$. Therefore, the sum of n and m is 2 to 6, which is equal to the number of bonds in $L^1$.

In one example, in Chemical Formula 4, $L^1$ may be a single bond. In Chemical Formula 4, when $L^1$ is a single bond, n and m are each 1, and $Z^2$ may also be a single bond. In such a case, the fluorinated compound represented by Chemical Formula 4 may be represented by the following Chemical Formula 4-1.

[Chemical Formula 4-1]

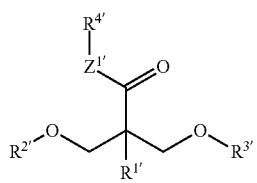

wherein, in Chemical Formula 4-1, $Z^{1'}$, $R^{1'}$, $R^{2'}$, $R^{3'}$ and $R^{4'}$ are the same as $Z^1$, $R^1$, $R^2$, $R^3$ and $R^4$ in Chemical Formula 4, respectively. The $Z^{1'}$, $R^{1'}$, $R^{2'}$, $R^{3'}$ and $R^{4'}$ may be substituents described herein as specific examples of $Z^1$, $R^1$, $R^2$, $R^3$ and $R^4$ of Chemical Formula 4.

In another example, in Chemical Formula 4, $L^1$ may be a divalent to hexavalent organic group from which the hydroxyl groups have been removed from the polyol as the hydroxyl groups of the polyol having 2 to 6 hydroxyl groups are substituted with $Z^1$ and $Z^2$.

In an example, the trivalent organic group from which the hydroxy groups have been removed from glycerol

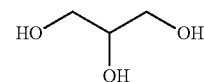

having three hydroxyl groups is represented as

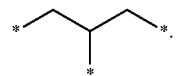

In Chemical Formula 4, the $L^1$ may be, for example, a divalent organic group in which the hydroxy groups have been removed from a diol such as ethanediol, propanediol, or butanediol; a trivalent organic group in which the hydroxy groups have been removed from a triol such as glycerol or trimethylolpropane; a tetravalent organic group in which the hydroxy groups have been removed from tetraol such as pentaerythritol or ditrimethylolpropane; a pentavalent organic group in which the hydroxy groups have been removed from pentaol, such as 6-methylheptanepentaol; or a hexavalent organic group in which the hydroxy groups have been removed from hexaol such as dipentaerythritol.

In Chemical Formula 4, when $L^1$ is a single bond or a divalent organic group, n and m are each 1. If the $L^1$ is a trivalent to hexavalent organic group, n may be larger than m. In one example, the n may be an integer of 1 to 3, and m may be an integer of 1.

In one example, the $L^1$ may be a trivalent organic group in which the hydroxy groups have been removed from glycerol which is a triol. And, n may be 2, and m may be 1. In such a case, the fluorinated compound represented by Chemical Formula 4 may be represented by the following Chemical Formula 4-2.

[Chemical Formula 4-2]

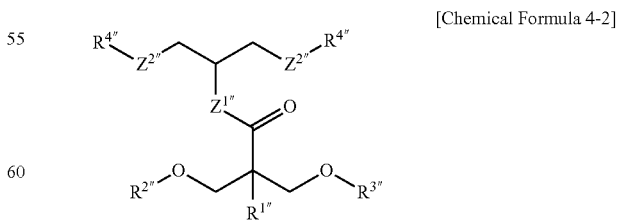

wherein, in Chemical Formula 4-2, $Z^{1''}$, $Z^{2''}$, $R^{1''}$, $R^{2''}$, $R^{3''}$ and $R^{4''}$ are the same as $Z^1$, $Z^2$, $R^1$, $R^2$, $R^3$ and $R^4$ of Chemical Formula 4, respectively. The $Z^{1''}$, $Z^{2''}$, $R^{1''}$, $R^{2''}$, $R^{3''}$ and $R^{4''}$ may be substituents described herein as specific examples of $Z^1$, $Z^2$, $R^1$, $R^2$, $R^3$ and $R^4$ of Chemical Formula 4.

In Chemical Formula 4, at least one of $R^2$ to $R^4$ is a fluorine-containing substituent. The fluorine-containing substituent may be an alkyl group having 1 to 20 carbon atoms substituted with 2 or more fluorines, a cycloalkyl group having 3 to 30 carbon atoms substituted with 2 or more fluorines, or an aryl group having 6 to 30 carbon atoms substituted with 2 or more fluorines. Specifically, the fluorine-containing substituent may be a straight chain alkyl group having 1 to 20 carbon atoms substituted with 2 or more fluorines. More specifically, the fluorine-containing substituent may be —$(CH_2)_a(CF_2)_bCHF_2$ or —$(CH_2)_a(CF_2)_bCF_3$. Wherein a is an integer of 0 to 3, an integer of 0 to 2, or an integer of 1, and b may be an integer of 0 to 19, an integer of 0 to 15, an integer of 0 to 12, an integer of 0 to 11, an integer of 0 to 10, or an integer of 0 to 9.

When $R^2$ and $R^3$ in Chemical Formula 4 are not fluorine-containing substituents, $R^2$ and $R^3$ may be each independently hydrogen, an alkyl group having 1 to 20 carbon atoms, a cycloalkyl group having 3 to 30 carbon atoms, a heterocycloalkyl group having 4 to 30 carbon atoms, a cycloalkylalkyl group having 7 to 40 carbon atoms, an aryl group having 6 to 30 carbon atoms, a heteroaryl group having 4 to 30 carbon atoms, or an arylalkyl group having 7 to 40 carbon atoms, or may be substituents in which at least one —$CH_2$— of the above substituents has been substituted with —O—, —S—, or —NH—.

Specifically, when $R^2$ and $R^3$ in Chemical Formula 4 are not fluorine-containing substituents, $R^2$ and $R^3$ may be each independently hydrogen, a straight chain alkyl group having 1 to 6 carbon atoms, a cycloalkyl group having 3 to 10 carbon atoms, a heterocycloalkyl group having 4 to 12 carbon atoms, an aryl group having 6 to 14 carbon atoms or —$(R^5$—$O)_p$—$R^6$. In the —$(R^5$—$O)_p$—$R^6$, $R^5$ is an alkylene group having 1 to 6 carbon atoms, $R^6$ is an alkyl group having 1 to 6 carbon atoms, and p may be an integer of 1 to 12.

More specifically, when $R^2$ and $R^3$ in Chemical Formula 4 are not fluorine-containing substituents, $R^2$ and $R^3$ are each independently hydrogen, a methyl group, an ethyl group, a propyl group, a butyl group, a cyclohexyl group, a tetrahydropyranyl group, a phenyl group or —$(R^5$—$O)_p$—$R^6$. Wherein, the $R^5$ may be an ethylene group, an n-propylene group, or an n-butylene group, particularly, an ethylene group. The $R^6$ may be a methyl group, an ethyl group, an n-propyl group, or an n-butyl group, particularly, a methyl group. The p may be, for example, an integer of 1 to 12, an integer of 1 to 10, an integer of 1 to 8, an integer of 1 to 6, an integer of 1 to 5, an integer of 1 to 4, or an integer of 1 to 3.

When $R^4$ in Chemical Formula 4 is not a fluorine-containing substituent, $R^4$ may be an alkyl group having 2 to 20 carbon atoms, a cycloalkyl group having 3 to 30 carbon atoms, a cycloalkylalkyl group having 7 to 40 carbon atoms, an aryl group having 6 to 30 carbon atoms, a heteroaryl group having 4 to 30 carbon atoms or an arylalkyl group having 7 to 40 carbon atoms, or may be a substituent in which at least one —$CH_2$— of the above substituents has been substituted with —O—, —S— or —NH—.

Specifically, when $R^4$ in Chemical Formula 4 is not a fluorine-containing substituent, $R^4$ may be a straight chain alkyl group having 2 to 6 carbon atoms, a cycloalkyl group having 3 to 10 carbon atoms, an aryl group having 6 to 14 carbon atoms or —$(R^5$—$O)_p$—$R^6$. In the —$(R^5$—$O)_p$—$R^6$, $R^5$ is an alkylene group having 1 to 6 carbon atoms, $R^6$ is an alkyl group having 1 to 6 carbon atoms, and p may be an integer of 1 to 12.

More specifically, when $R^4$ in Chemical Formula 4 is not a fluorine-containing substituent, $R^4$ may be —$(R^5$—$O)_p$—$R^6$. Wherein, the $R^5$ may be an ethylene group, an n-propylene group, or an n-butylene group, particularly, an ethylene group. The $R^6$ may be a methyl group, an ethyl group, an n-propyl group, or an n-butyl group, particularly, methyl group. The p may be, for example, an integer of 1 to 12, an integer of 1 to 10, an integer of 1 to 8, an integer of 1 to 6, an integer of 1 to 5, an integer of 1 to 4, or an integer of 1 to 3.

The fluorinated compound represented by Chemical Formula 4 may include a fluorinated compound represented by Chemical Formula 4-1, a fluorinated compound represented by Chemical Formula 4-2, or a mixture thereof. Specifically, the fluorinated compound represented by Chemical Formula 4 may include at least one fluorinated compound selected from the group consisting of fluorinated compounds represented by the following Chemical Formulas 4-1-1 to 4-1-5 and the following Chemical Formulas 4-2-1 to 4-2-5.

[Chemical Formula 4-1-1]

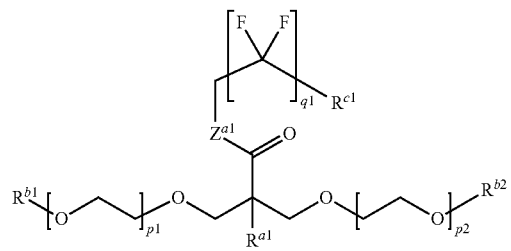

wherein, in Chemical Formula 4-1-1,
$R^{a1}$ is a methyl group or an ethyl group,
$R^{b1}$ and $R^{b2}$ are each independently hydrogen or an alkyl group having 1 to 4 carbon atoms,
$R^{c1}$ is $CF_3$ or $CHF_2$,
$Z^{a1}$ is —O— or —NH—,
p1 and p2 are each independently an integer of 0 to 3, and
q1 is an integer of 0 to 9,

[Chemical Formula 4-1-2]

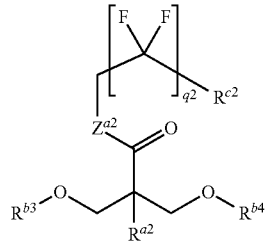

wherein, in Chemical Formula 4-1-2,
$R^{a2}$ is a methyl group or an ethyl group,
$R^{b3}$ and $R^{b4}$ are each independently a cyclohexyl group, a tetrahydropyranyl group, or a phenyl group,
$R^{c2}$ is $CF_3$ or $CHF_2$,
$Z^{a2}$ is —O— or —NH—, and
q2 is an integer of 0 to 9,

[Chemical Formula 4-1-3]

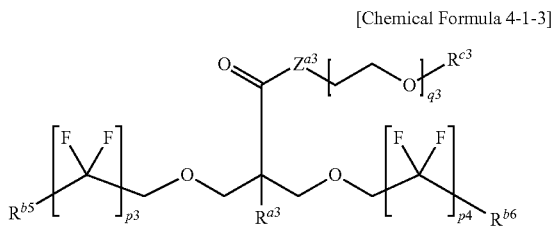

wherein, in Chemical Formula 4-1-3,
$R^{a3}$ is a methyl group or an ethyl group,
$R^{b5}$ and $R^{b6}$ are each independently $CF_3$ or $CHF_2$,
$R^{c3}$ is an alkyl group having 1 to 4 carbon atoms,
$Z^{a3}$ is —O— or —NH—,
p3 and p4 are each independently an integer of 0 to 9, and
q3 is an integer of 0 to 3,

[Chemical Formula 4-1-4]

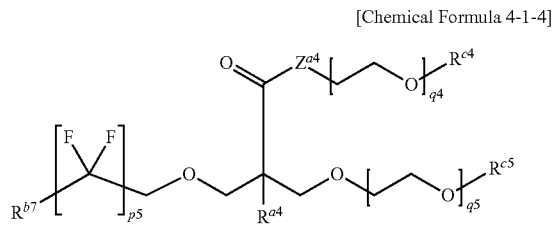

wherein, in Chemical Formula 4-1-4,
$R^{a4}$ is a methyl group or an ethyl group,
$R^{b7}$ is $CF_3$ or $CHF_2$,
$R^{c4}$ and $R^{c5}$ are each independently an alkyl group having 1 to 4 carbon atoms, $Z^{a4}$ is —O— or —NH—,
p5 is an integer of 0 to 9, and
q4 and q5 are each independently an integer of 0 to 3,

[Chemical Formula 4-1-5]

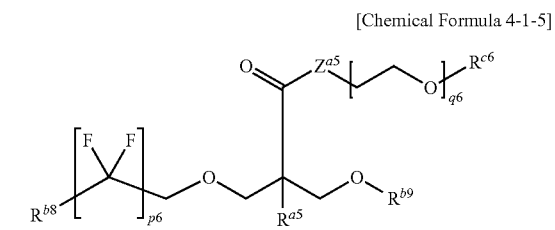

wherein, in Chemical Formula 4-1-5,
$R^{a5}$ is a methyl group or an ethyl group,
$R^{b}s$ is $CF_3$ or $CHF_2$,
$R^{b9}$ is a cyclohexyl group, a tetrahydropyranyl group, or a phenyl group,
$R^{C6}$ is an alkyl group having 1 to 4 carbon atoms,
$Z^{a5}$ is —O— or —NH—,
p6 is an integer of 0 to 9, and
q6 is an integer of 0 to 3,

[Chemical Formula 4-2-1]

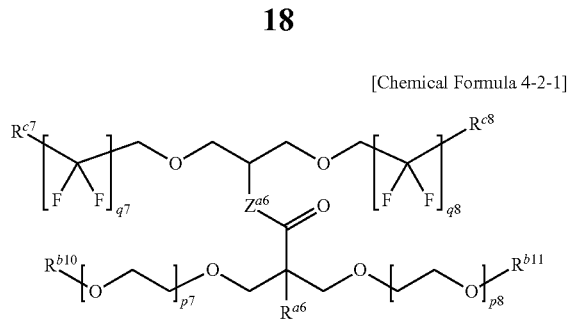

wherein, in Chemical Formula 4-2-1,
$R^{a6}$ is a methyl group or an ethyl group,
$R^{b10}$ and $R^{b1}$ are each independently hydrogen or an alkyl group having 1 to 4 carbon atoms,
$R^{C7}$ and $R^{C8}$ are each independently $CF_3$ or $CHF_2$,
$Z^{a6}$ is —O— or —NH—,
p7 and p8 are each independently an integer of 0 to 3, and
q7 and q8 are each independently an integer of 0 to 9,

[Chemical Formula 4-2-2]

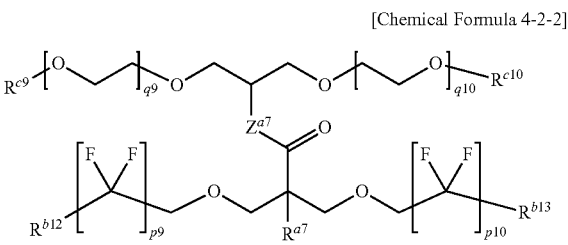

wherein, in Chemical Formula 4-2-2,
$R^{a7}$ is a methyl group or an ethyl group,
$R^{b12}$ and $R^{b13}$ are each independently $CF_3$ or $CHF_2$,
$R^{c9}$ and $R^{c10}$ are each independently an alkyl group having 1 to 4 carbon atoms,
$Z^{a7}$ is —O— or —NH—,
p9 and p10 are each independently an integer of 0 to 9, and
q9 and q10 are each independently an integer of 0 to 3,

[Chemical Formula 4-2-3]

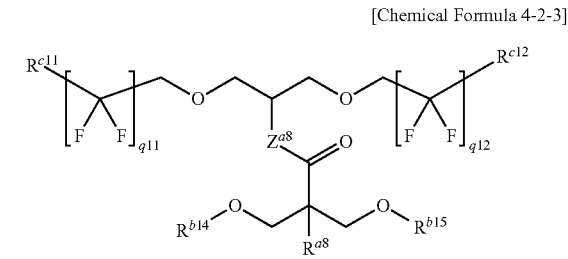

wherein, in Chemical Formula 4-2-3,
$R^{a8}$ is a methyl group or an ethyl group,
$R^{b14}$ and $R^{b15}$ are each independently a cyclohexyl group, a tetrahydropyranyl group, or a phenyl group,
$R^{c11}$ and $R^{c12}$ are each independently $CF_3$ or $CHF_2$,
$Z^{a8}$ is —O— or —NH—, and
q11 and q12 are each independently an integer of 0 to 9,

[Chemical Formula 4-2-4]

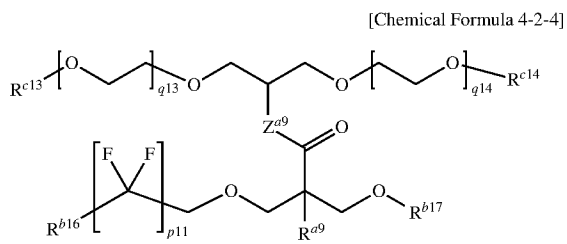

wherein, in Chemical Formula 4-2-4,
$R^{a9}$ is a methyl group or an ethyl group,
$R^{b16}$ is $CF_3$ or $CHF_2$,
$R^{b17}$ is a cyclohexyl group, a tetrahydropyranyl group, or a phenyl group,
$R^{c13}$ and $R^{c14}$ are each independently an alkyl group having 1 to 4 carbon atoms,
$Z^{a9}$ is —O— or —NH—,
p11 is an integer of 0 to 9, and
q13 and q14 are each independently an integer of 0 to 3,

[Chemical Formula 4-2-5]

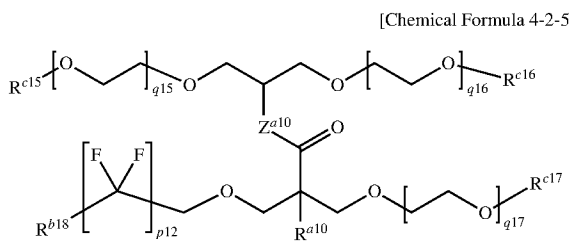

wherein, in Chemical Formula 4-2-5,
$R^{a10}$ is a methyl group or an ethyl group,
$R^{b18}$ is $CF_3$ or $CHF_2$,
$R^{c15}$ to $R^{c17}$ are each independently an alkyl group having 1 to 4 carbon atoms,
$Z^{a10}$ is —O— or —NH—,
p12 is an integer of 0 to 9, and
q15 to q17 are each independently an integer of 0 to 3.

The photopolymer layer may contain the fluorinated compound in an amount of 20 to 200 parts by weight based on 100 parts by weight of the polymer matrix. Specifically, the lower limit of the content of the fluorinated compound may be, for example, 20 parts by weight or more, 25 parts by weight or more, 30 parts by weight or more, 35 parts by weight or more, 40 parts by weight or more, 45 parts by weight or more, 50 parts by weight or more, or 55 parts by weight or more, and the upper limit thereof may be, for example, 200 parts by weight or less, 180 parts by weight or less, 150 parts by weight or less, 120 parts by weight or less, or 100 parts by weight or less. When the above range is satisfied, it can represent large refractive index modulation values after recording due to fluorinated compounds having sufficient low refractive index, without problems of deteriorating the compatibility with the components contained in the photopolymer composition, of eluting some fluorinated compounds to the surface of the photopolymer layer, or of degrading haze, which are advantageous for ensuring excellent optical recording properties.

The photopolymer layer may further include additives such as an antifoaming agent.

The photopolymer layer can include a silicone-based reactive additive as an antifoaming agent. As the silicone-based reactive additive, for example, commercial products such as Tego Rad 2500 can be used.

The content of the additive, for example, an antifoaming agent, can be appropriately adjusted at a level that does not interfere with the function of the hologram recording medium.

The photopolymer layer may be formed from a photopolymer composition containing a solvent.

The solvent may be an organic solvent, and an example thereof may be at least one organic solvent selected from the group consisting of ketones, alcohols, acetates, and ethers, but is not limited thereto. Specific examples of such organic solvents include at least one selected from the group consisting of ketones such as methyl ethyl ketone, methyl isobutyl ketone, acetylacetone, or isobutyl ketone; alcohols such as methanol, ethanol, n-propanol, i-propanol, n-butanol, i-butanol, or t-butanol; acetates such as ethyl acetate, i-propyl acetate, or polyethylene glycol monomethyl ether acetate; and ethers such as tetrahydrofuran or propylene glycol monomethyl ether.

The organic solvent may be added at the time point when respective components contained in the photopolymer composition are mixed, or it may be added after respective components are added in a state of being dispersed or mixed in an organic solvent, and then included in the photopolymer composition.

The photopolymer composition may include a solvent such that the solid content concentration is 1 to 90% by weight. Specifically, the photopolymer composition may include a solvent such that the solid concentration is 20% by weight or more, 30% by weight or more, 50% by weight or more, or 60% by weight or more, and 85% by weight or less, 80% by weight or less, 75% by weight or less, or 70% by weight or less. Within this range, the photopolymer composition exhibits appropriate flowability and can form a coating film without defects such as stripes. No defects occur during the drying and curing process, and a photopolymer layer exhibiting desired physical and surface properties can be formed.

As the hologram recording medium according to one embodiment of the invention includes the above-mentioned photopolymer layer, it can exhibit excellent reliability and high transparency even in a high temperature/high humidity environment.

Specifically, the hologram recording medium of one embodiment of the invention may have a refractive index variation calculated by the following Equation 4 of 1.0% or less.

$$\text{Refractive index variation (\%)} = \{|1 - n_1/n_0|\} \times 100 \quad \text{[Equation 4]}$$

wherein, in Equation 4, no is the refractive index of a sample in which the hologram recording medium before recording is stored at a temperature of 20 to 25° C. and a relative humidity of 40 to 50% and then bleached with a white LED, and $n_1$ is the refractive index of a sample in which the hologram recording medium before recording is stored at a temperature of 60° C. and a relative humidity of 90% for 72 hours and then bleached with a white LED.

The refractive index variation being 1.0% or less means that even when the hologram recording medium before recording is exposed to high temperature and high humidity conditions, it exhibits excellent stability, and the difference in refractive index before and after exposure to high temperature and high humidity conditions is as small as 1.0% or less. In particular, since the plasticizer contained in the hologram recording medium before recording is fluid, it may migrate to the surface of the photopolymer layer, making it impossible to exhibit the originally intended optical recording properties. However, the hologram recording medium according to one embodiment of the invention includes a fluorinated compound represented by Chemical Formula 4 as a plasticizer, whereby the refractive index variation calculated by Equation 4 may be very small.

The upper limit of the refractive index variation of the hologram recording medium may be, for example, 1.0% or less, 0.9% or less, 0.8% or less, 0.7% or less, 0.6% or less, 0.5% or less, 0.4% or less, 0.3% or less, 0.25% or less, or 0.2% or less. And, the lower limit thereof may be, for example, 0% or more.

On the other hand, since the hologram recording medium uses a mixture of a component having a low refractive index and a component having a high refractive index to record optical properties, it tends to have opaque characteristics due to their compatibility. However, the hologram recording medium can exhibit high transparency optical properties by using a fluorinated compound with a specific structure with their excellent compatibility.

Specifically, the haze of the hologram recording medium according to one embodiment of the invention may be 2% or less. The upper limit of the haze may be, for example, 1.5% or less, 1.4% or less, 1.3% or less, 1.2% or less, 1.1% or less, 1.0% or less, 0.9% or less, 0.8% or less, or 0.7% or less. The lower limit of the haze is not particularly limited, and may be 0% or more. The haze can be measured by the method set forth in the Test Example described below.

The hologram recording medium according to one embodiment of the invention has excellent refractive index modulation, diffraction efficiency, and driving reliability despite having a photopolymer layer of thin thickness.

The thickness of the photopolymer layer may be, for example, in the range of 5.0 to 40.0 μm. Specifically, the lower limit of the thickness of the photopolymer layer may be, for example, 6 μm or more, 7 μm or more, 8 μm or more, or 9 μm or more. And, the upper limit of the thickness may be, for example, 35 μm or less, 30 μm or less, 29 μm or less, 28 μm or less, 27 μm or less, 26 μm or less, 25 μm or less, 24 μm or less, 23 μm or less, 22 μm or less, 21 μm or less, 20 μm or less, 19 μm or less, or 18 μm or less.

The hologram recording medium according to one embodiment of the invention may further include a substrate on at least one surface of the photopolymer layer. The type of the substrate is not particularly limited, and those known in the related technical field can be used. For example, substrates such as glass, PET (polyethylene terephthalate), TAC (triacetyl cellulose), PC (polycarbonate), or COP (cycloolefin polymer) can be used.

The hologram recording medium according to one embodiment of the invention can have high diffraction efficiency. In one example, the hologram recording medium may have a diffraction efficiency of 70% or more when recording a notch filter hologram. Wherein, the thickness of the photopolymer layer may be, for example, 5 to 30 μm. Specifically, when recording the notch filter hologram, the diffraction efficiency may be 71% or more, 72% or more, 73% or more, 74% or more, 75% or more, 80% or more, 81% or more, 82% or more, 83% or more, 84% or more, 85% or more, 86% or more, 87% or more, 88% or more, 89% or more, 90% or more, or 91% or more. In this manner, the hologram recording medium according to one embodiment of the invention can realize excellent diffraction efficiency even if it includes a photopolymer layer of thin thickness. The diffraction efficiency can be measured by the method described in the Test Example described below.

The hologram recording medium according to one embodiment of the invention can realize a refractive index modulation value (Δn) of 0.020 or more, 0.025 or more, 0.026 or more, 0.027 or more, 0.028 or more, 0.029 or more, 0.030 or more, 0.031 or more, 0.032 or more, 0.033 or more, 0.034 or more, or 0.035 or more even if the thickness of the photopolymer layer is as thin as 5 to 30 μm. The upper limit of the refractive index modulation value is not particularly limited, but may be, for example, 0.060 or less. The refractive index modulation value can be measured by the method set forth in the Test Example described below.

The hologram recording medium according to one embodiment of the invention not only exhibits excellent durability in a high temperature/high humidity environment before recording, but also can exhibit excellent durability even in a high temperature/high humidity environment after recording.

In one example, the hologram recording medium according to one embodiment of the invention may have a peak variation of 3% or less as calculated by Equation 3 below.

$$\text{Peak variation} = \{|1 - A_1/A_0|\} \times 100 \quad \text{[Equation 3]}$$

wherein, in Equation 3, $A_0$ is the wavelength of the lowest transmittance of the hologram recording medium for the wavelength range of 300 to 1,200 nm, and $A_1$ is the wavelength of the lowest transmittance measured after exposing the hologram recording medium to a temperature of 60° C. and a relative humidity of 90% for 72 hours.

The peak variation describes the degree of movement of the wavelength exhibiting the lowest transmittance before and after high temperature/high humidity conditions. In one example, if a holographic grating (e.g., reflective hologram) was recorded to reflect light of a specific wavelength of 680 nm, the transmittance at 680 nm has a minimum value. Further, if the transmittance is measured again after exposure to high temperature/high humidity conditions, the minimum transmittance may appear at 675 nm. In such a case, according to Equation 3 above, it can be considered that there is a peak variation of less than 1%. In this manner, depending on the conditions under which the hologram grating is driven or stored, a peak variation in which the minimum transmittance wavelength moves to a shorter wavelength occurs, while the spacing of the diffraction gratings decreases (i.e., the diffraction grating shrinks). Conversely, when the spacing of the holographic diffraction grating increases (expansion of the diffraction grating), a peak variation in which the minimum transmittance wavelength moves to the longer wavelength side may occur. The degree of this peak variation depends on the reliability of the diffraction grating.

That is, the peak variation value being 3% or less means that the deformation (shrinkage or expansion) of the diffraction grating can be suppressed, as if it has a peak variation of 3% or less even when exposed to harsh conditions such as high temperature/high humidity. Such hologram recording media can provide good color reproducibility and image clarity even when exposed to harsh conditions.

The peak variation for the hologram recording medium according to one embodiment of the invention may be, for example, 2.5% or less, 2.0% or less, 1.9% or less, 1.8% or less, 1.7% or less, 1.6% or less, 1.5% or less, 1.4% or less, 1.3% or less, 1.2% or less, or 1.1% or less. The lower limit of the peak variation is not particularly limited, and may be 0% or more.

The hologram recording medium may have a notch filter structure in relation to the diffraction grating structure. The hologram recording medium according to one embodiment of the invention having a notch filter structure may mean that the diffraction grating is non-slanted (substantially 0°) with respect to the substrate surface, for example, as if the diffraction grating is parallel to the substrate surface. Such a hologram recording medium may have a structure in which two layers having different refractive indexes (e.g., a high refractive index layer and a low refractive index layer) are alternately repeated. Further, the two repeated layers may respectively have a predetermined thickness that is the same or different from each other. Such a non-slanted diffraction grating record can be prepared in such a way that the incident angles of the incident object light and reference light are made equal based on the normal line. In the non-slanted structure, the degree of deformation (e.g., shrinkage or expansion) under high temperature/high humidity conditions is further clearly confirmed compared to the slanted structure, and it is less affected by the shrinkage and expansion of the substrate.

The use of the hologram recording medium according to one embodiment of the invention is not particularly limited. By way of non-limiting example, the hologram recording medium can be used in applications that are highly likely to be exposed to high temperature/high humidity environments, specifically smart devices such as mobile devices, parts of wearable displays, or automotive parts (e.g. head up displays).

On the other hand, the hologram recording medium according to one embodiment of the invention can be prepared through the step of applying the photopolymerizable composition to form a photopolymer layer, and can be prepared in a form in which optical information is recorded through the step of irradiating a coherent laser onto a predetermined area of the photopolymer layer thus prepared and selectively polymerizing the photoreactive monomer contained in the photopolymer layer to record optical information.

In the step of forming the photopolymer layer, a photopolymer composition containing the above-mentioned structure can first be prepared. When preparing the photopolymer composition, for mixing each component, a commonly known mixer, stirrer, mixer or the like can be used without particular restriction. Further, such a mixing process may be performed at a temperature ranging from 0° C. to 100° C., a temperature ranging from 10° C. to 80° C., or a temperature ranging from 20° C. to 60° C.

In the step of forming the photopolymer layer, the prepared photopolymer composition can be applied to form a coating film formed from the photopolymer composition. The coating film can be dried naturally at room temperature or dried at a temperature in the range of 30 to 80° C. This process can induce a hydrosilylation reaction between the hydroxy group of the (meth)acrylic-based polyol remaining unreacted and the silane functional group of the siloxane-based polymer.

In the photopolymer layer prepared through the step of forming the photopolymer layer, a fluorinated compound, a photoreactive monomer and a photoinitiator system, and additives added as necessary may be uniformly dispersed within the crosslinked polymer matrix.

Subsequently, in the step of recording optical information, if a coherent laser is irradiated onto the photopolymer layer, in the area where constructive interference occurs, polymerization of photoreactive monomers occurs to form a photopolymer, and in the area where destructive interference occurs, polymerization of the photoreactive monomer does not occur or is suppressed, so that the photoreactive monomer are present. Further, while the unreacted photoreactive monomer causes refractive index modulation while diffusion occurs toward the photopolymer side where the concentration of photoreactive monomers is lower, and a diffraction grating is produced by the refractive index modulation. Thereby, holograms, i.e. optical information, are recorded on the photopolymer layer having the diffraction grating.

The hologram recording medium according to one embodiment of the invention can be provided in a state that terminates the reaction of the photoreactive monomer and removes the color of the photosensitive dye, through a step of photobleaching by irradiating light onto the entire photopolymer layer on which optical information is recorded, which can be performed after the step of recording the optical information.

In one example, in the photobleaching step, ultraviolet rays (UVA) in the range of 320 to 400 nm are irradiated to terminate the reaction of the photoreactive monomer and remove the color of the photosensitizing dye.

On the other hand, according to another embodiment of the present invention, there is provided a hologram recording medium comprising: a photopolymer layer which includes a polymer matrix formed by crosslinking a siloxane-based polymer containing a silane functional group and a (meth)acrylic-based polyol, or a precursor thereof; a photoreactive monomer and a photoinitiator system or a photopolymer obtained therefrom; and a fluorinated compound represented by the following Chemical Formula 4.

[Chemical Formula 4]

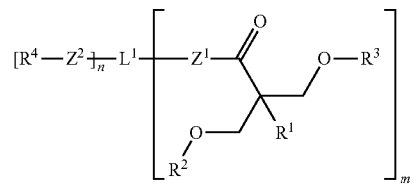

wherein, in Chemical Formula 4, $Z^1$ is —O— or —NH—, $Z^2$ is a single bond, —O— or —NH—, $L^1$ is a single bond or a divalent to hexavalent organic group in which hydroxy groups have been removed from a polyol having 2 to 6 hydroxyl groups, n and m are each independently an integer of 1 to 5, wherein the sum of n and m is 2 to 6, $R^1$ is a methyl group or an ethyl group, and at least one of $R^2$ to $R^4$ is a fluorine-containing substituent, which is an alkyl group having 1 to 20 carbon atoms substituted with 2 or more fluorines, a cycloalkyl group having 3 to 30 carbon atoms substituted with 2 or more fluorines, or an aryl group having 6 to 30 carbon atoms substituted with 2 or more fluorines, when $R^2$ and $R^3$ are not fluorine-containing substituents, they are each independently hydrogen, an alkyl group having 1 to 20 carbon atoms, a cycloalkyl group having 3 to 30 carbon atoms, a heterocycloalkyl group having 4 to 30 carbon atoms, a cycloalkylalkyl group having 7 to 40 carbon atoms, an aryl group having 6 to 30 carbon atoms, a heteroaryl group having 4 to 30 carbon atoms or an arylalkyl group having 7 to 40 carbon atoms, or a substituent in which at least one —CH$_2$— of the above substituents is substituted with —O—, —S— or —NH—, and when $R^4$ is not a fluorine-containing substituent, it is an alkyl group having 2 to 20 carbon atoms, a cycloalkyl group having 3 to 30 carbon atoms, a cycloalkylalkyl group having 7 to 40 carbon atoms, an aryl group having 6 to 30 carbon atoms, a heteroaryl group having 4 to 30 carbon atoms or an arylalkyl group having 7 to 40 carbon atoms, or is a substituent in which at least one —CH$_2$— of the above substituents is substituted with —O—, —S—, or —NH—.

The hologram recording medium according to another embodiment of the invention includes a fluorinated compound with a specific structure as a plasticizer, so that it not only has improved optical recording properties but also can exhibit high reliability and high transparency optical properties even in a high temperature/high humidity environment.

For example, the hologram recording medium according to the other embodiment can exhibit high reliability even in a high temperature/high humidity environment to the extent that the refractive index variation calculated by Equation 4 has a low value of 1.0% or less, and it can exhibit high transparency with a haze of 2% or less, but is not limited thereto.

For a polymer matrix or a precursor thereof; a photoreactive monomer and a photoinitiator system or a photopolymer obtained therefrom; and a fluorinated compound represented by Chemical Formula 4, which are included in the hologram recording medium according to another embodiment of the invention, the same compounds as those included in the hologram recording medium according to one embodiment of the invention can be used. The polymer matrix or a precursor thereof; the photoreactive monomer and the photoinitiator system or the photopolymer obtained therefrom; and the fluorinated compound represented by Chemical Formula 4 have been described in detail above, and therefore, detailed description thereof is omitted here.

On the other hand, according to yet another embodiment of the invention, there is provided an optical element including the hologram recording medium.

Specific examples of the optical elements may include smart devices such as mobile devices, parts of wearable displays, vehicle articles (e.g., head up display), holographic fingerprint recognition system, optical lenses, mirrors, deflecting mirrors, filters, diffusing screens, diffraction elements, light guides, waveguides, holographic optical elements having projection screen and/or mask functions, medium of optical memory system and light diffusion plate, optical wavelength multiplexers, reflection type, transmission type color filters, and the like.

An example of an optical element including the hologram recording medium may include a hologram display device. The hologram display device includes a light source unit, an input unit, an optical system, and a display unit.

Specifically, the light source unit is a portion that irradiates a laser beam used for providing, recording, and reproducing three-dimensional image information of an object in the input unit and the display unit.

The input unit is a portion that previously inputs three-dimensional image information of an object to be recorded on the display unit, specifically, a portion in which three-dimensional information of an object such as the intensity and phase of light for each space can be inputted into an electrically addressed liquid crystal SLM, wherein an input beam may be used.

The optical system may include a mirror, a polarizer, a beam splitter, a beam shutter, a lens, and the like. The optical system can be distributed into an input beam for sending a laser beam emitted from the light source unit to the input unit, a recording beam for sending the laser beam to the display unit, a reference beam, an erasing beam, a reading beam, and the like.

The display unit can receive three-dimensional image information of an object from an input unit, record it on a hologram plate comprising an optically addressed SLM, and reproduce the three-dimensional image of the object. At this time, the three-dimensional image information of the object can be recorded via interference of the input beam and the reference beam. The three-dimensional image information of the object recorded on the hologram plate can be reproduced into a three-dimensional image by the diffraction pattern generated by the reading beam. The erasing beam can be used to quickly remove the formed diffraction pattern. On the other hand, the hologram plate can be moved between a position at which a three-dimensional image is inputted and a position at which a three-dimensional image is reproduced.

Advantageous Effects

The hologram recording medium according to one embodiment of the invention not only has excellent optical recording properties but also can exhibit transparent optical properties and excellent reliability even in high temperature and high humidity environments.

BRIEF DESCRIPTION OF THE DRAWINGS

FIG. 1 schematically shows the recording equipment setup for hologram recording. Specifically, FIG. 1 schematically shows the process in which a laser of a predetermined wavelength is radiated from the light source 10, and irradiated onto the PP (hologram recording medium) 80 located on one surface of a mirror 70 via mirrors 20 and 20', an iris 30, a spatial filter 40, an iris 30', a collimation lens 50, and PBS (Polarized Beam Splitter) 60.

DETAILED DESCRIPTION OF THE EMBODIMENTS

Hereinafter, the action and effect of the invention will be described in more detail with reference to specific examples of the invention. However, these examples are presented for illustrative purposes only, and the scope of the invention is not limited thereby in any way.

In the following Preparation Examples, Examples, and Comparative Examples, the content of raw materials, and the like means the content based on solid content, unless otherwise specified.

Preparation Example 1: Preparation of (Meth)Acrylic-Based Polyol 132 g of butyl acrylate, 420 g of ethyl acrylate, and 48 g of hydroxybutyl acrylate were added to a 2 L jacketed reactor, and diluted with 1200 g of ethyl acetate. The reaction temperature was set to 60-70° C., and the mixture was stirred for about 30 minutes to 1 hour. 0.42 g of n-dodecyl mercaptan (n-DDM) was further added, and stirring was further performed for about 30 minutes. Then, 0.24 g of AIBN as a polymerization initiator was added, polymerization was carried out at the reaction temperature for 4 hours or more, and kept until the residual acrylate content became less than 1%. Thereby, a (meth)acrylate-based copolymer (weight average molecular weight of about 300,000, OH equivalent of about 1802 g/equivalent) in which the hydroxy group is located in the branched chain was prepared.

Example 1: Preparation of Photopolymer Composition and Hologram Recording Medium (1) Preparation of Photopolymer Composition 1.27 g of poly(methylhydrosiloxane) (Sigma-Aldrich, number average molecular weight: about 390, Si—H equivalent: about 103 g/equivalent) as a siloxane-based polymer and 11.12 g of (meth)acrylic-based polyol prepared in Preparation Example 1 were first mixed (SiH/OH molar ratio=2.0).

Then, 20 g of HR 6042 (Miwon Specialty Chemical, refractive index of 1.60) as a photoreactive monomer, 0.08 g of photosensitizing dye H-Nu 640 (Spectra Group), 0.3 g of borate V as a coinitiator, 0.05 g of H-Nu 254 (Spectra), 10 g of the fluorinated compound represented by the following Chemical Formula a as a plasticizer and 26 g of methyl isobutyl ketone (MIBK) as a solvent were added, and the mixture was stirred with a paste mixer for about 30 minutes while blocking light. After that, a photopolymer composition was prepared by adding Karstedt (Pt-based) catalyst for matrix crosslinking.

[Chemical Formula a]

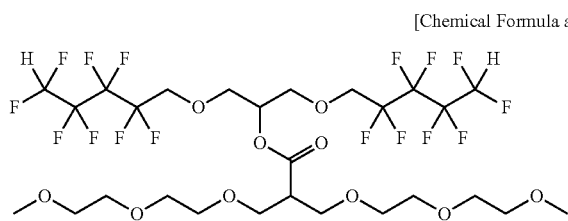

(2) Preparation of Hologram Recording Media

The photopolymer composition was coated to a predetermined thickness on a 60 μm thick TAC substrate using a Mayer bar, and dried at 80° C. for 10 minutes. The thickness of the photopolymer layer after drying was about 15 μm.

The diffraction grating was recorded using the same setup as in FIG. 1. Specifically, when the prepared photopolymer layer was laminated on a mirror and then irradiated with a laser, a notch filter hologram having periodic refractive index modulation in the thickness direction through interference between incident light L and light reflected from a mirror L' can be recorded. In this example, a notch filter hologram was recorded with an incident angle of 0° (degree). A notch filter and a Bragg reflector are optical devices that reflect only light of a specific wavelength, and have a structure in which two layers with different refractive indexes are stacked periodically and repeatedly at a certain thickness.

Examples 2 to 11 and Comparative Examples 1 to 4: Preparation of Photopolymer Composition and Hologram Recording Medium A photopolymer composition and a hologram recording medium were prepared in the same manner as in Example 1, except that the components and contents of the photopolymer composition were different as shown in Table 1 below.

TABLE 1

| | Photosensitizing dye | | | |
| | Red Dye (H-Nu 640) | Green Dye (Safranin O) | Plasticizer | Recording wavelength |
| --- | --- | --- | --- | --- |
| Example 1 | 0.08 g | | [Chemical Formula a] 10 g | 660 nm |
| Example 2 | 0.08 g | | [Chemical Formula b] 10 g | 660 nm |
| Example 3 | | 0.05 g | [Chemical Formula c] 10 g | 532 nm |
| Example 4 | 0.08 g | | [Chemical Formula c] 10 g | 660 nm |
| Example 5 | 0.08 g | | [Chemical Formula d] 10 g | 660 nm |
| Example 6 | | 0.05 g | [Chemical Formula e] 10 g | 532 nm |
| Example 7 | 0.08 g | | [Chemical Formula e] 10 g | 660 nm |
| Example 8 | 0.08 g | | [Chemical Formula f] 10 g | 660 nm |
| Example 9 | 0.08 g | | [Chemical Formula g] 12 g | 660 nm |
| Example 10 | | 0.05 g | [Chemical Formula h] 12 g | 532 nm |
| Example 11 | | 0.05 g | [Chemical Formula i] 12 g | 532 nm |
| Comparative Example 1 | 0.08 g | | [Chemical Formula j] 10 g | 660 nm |
| Comparative Example 2 | 0.08 g | | [Chemical Formula j] 5 g | 660 nm |
| Comparative Example 3 | | 0.05 g | [Chemical Formula j] 5 g | 532 nm |
| Comparative Example 4 | | 0.05 g | [Chemical Formula k] 10 g | 532 nm |

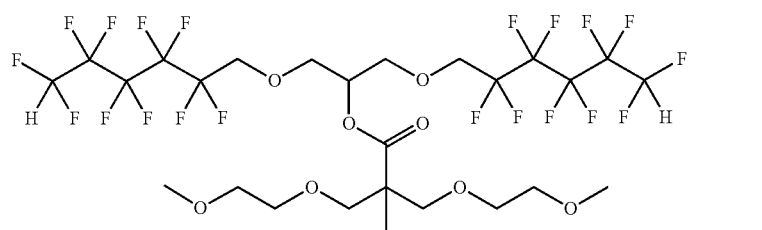
[Chemical Formula b]
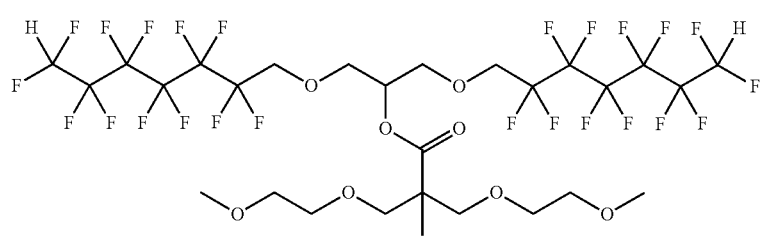
[Chemical Formula c]
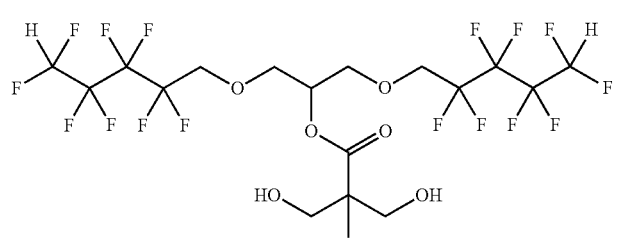
[Chemical Formula d]
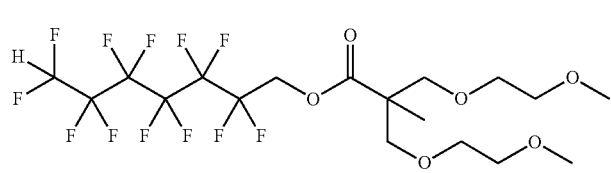
[Chemical Formula e]
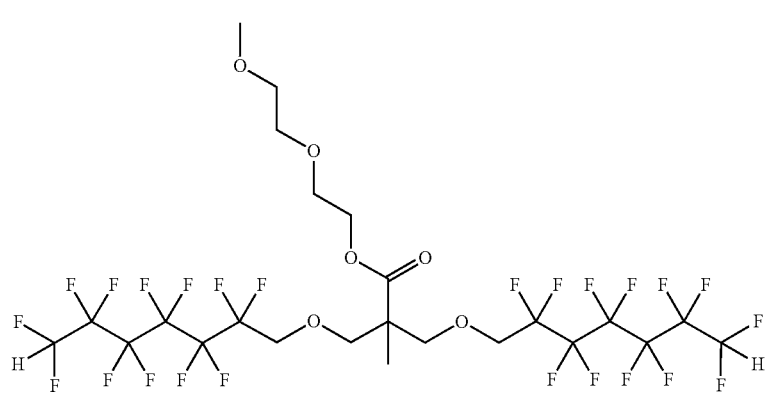
[Chemical Formula f]
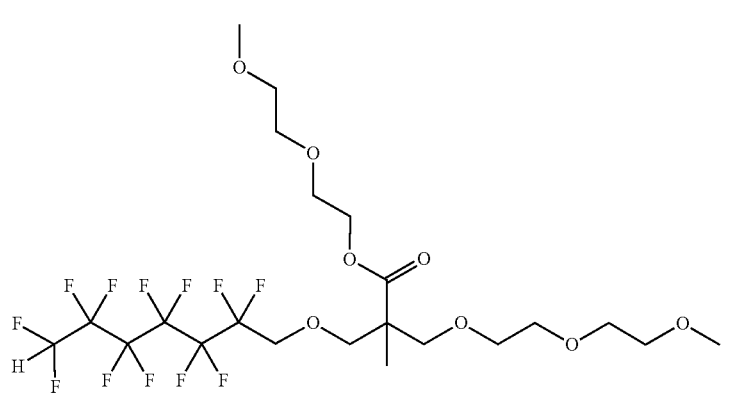
[Chemical Formula g]

[Chemical Formula h]

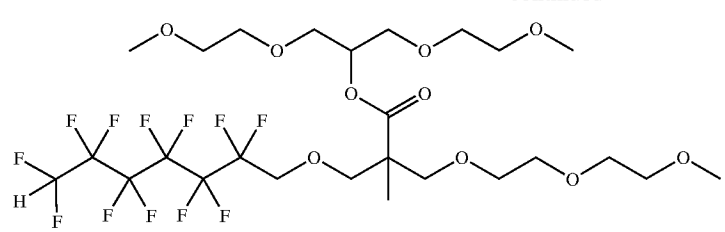

[Chemical Formula i]

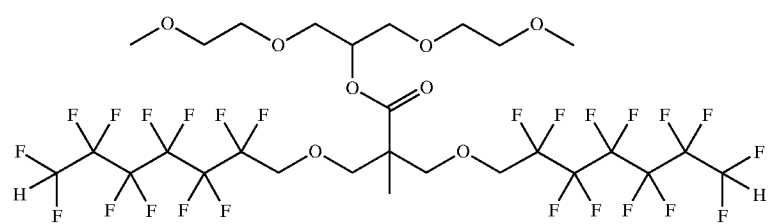

[Chemical Formula j]

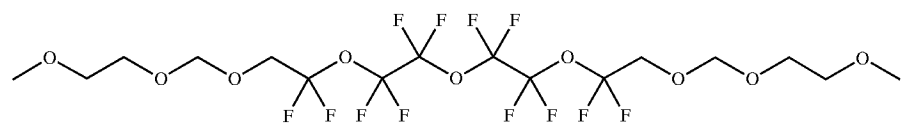

[Chemical Formula k]

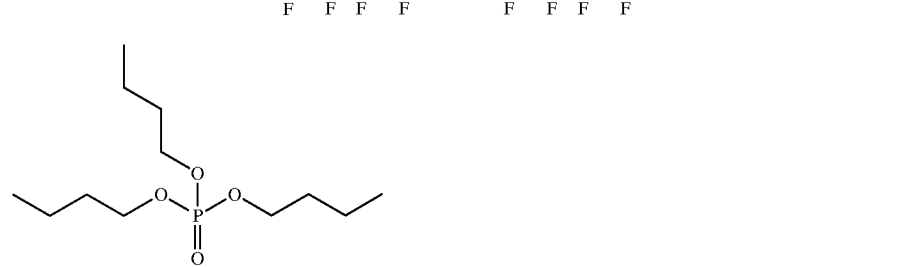

Test Example: Performance Evaluation of Hologram Recording Media (1) Diffraction Efficiency Diffraction efficiency (η) was determined through the following Equation 1.

$$\eta(\%) = \{P_D/(P_D + P_T)\} \times 100 \quad \text{[Equation 1]}$$

wherein, in Equation 1, η is the diffraction efficiency, $P_D$ is the output amount (mW/cm$^2$) of the diffracted beam of the sample after recording, and $P_T$ is the output amount (mW/cm$^2$) of the transmitted beam of the sample after recording.

(2) Refractive Index Modulation Value (Δn)

The refractive index modulation value (Δn) was determined through the following Equation 2 and Bragg's equation.

$$\eta = \tanh^2 \left| \frac{\pi \Delta n d}{\lambda \left( \cos^2\theta - \frac{\lambda}{n\Lambda} \cos\phi \right)^{1/2}} \right| \quad \text{[Equation 2]}$$

$$\cos(\theta - \phi) = \frac{\lambda}{2n\Lambda} \quad \text{[Bragg's Equation]}$$

wherein, in Equations, η is the reflectance diffraction efficiency (DE), d is the thickness of the photopolymer layer, Λ is the wavelength of incident light for recording (660 nm or 532 nm), θ is the angle of incidence of the incident light for recording, φ is the slant angle of the grating, Δn is the refractive index modulation value, n is the refractive index of the photopolymer, and Λ means the diffraction grating period. In the above Examples and Comparative Examples, since holograms were recorded using the notch filter method, both θ (incident angle) and #(slant angle of the grating) were 0°.

(3) Haze

Haze was measured using a HAZE METER (Murakami Color Research Laboratory, HM-150) in accordance with JIS K 7136. The measurement light was incident on the substrate side surface of the hologram recording medium.

(4) Peak Variation

In order to evaluate the reliability of a hologram recording medium recorded with a diffraction grating in a high temperature/high humidity environment, the degree of movement of the wavelength that shows the maximum reflectance before and after exposing the sample recorded with the diffraction grating to high temperature/high humidity conditions was confirmed.

First, the specific wavelength (or wavelength band) ($A_0$) at which the sample recorded with the diffraction grating had the highest reflectance (i.e., lowest transmittance) was analyzed (analyzed at room temperature and non-high humidity conditions). UV-Vis spectroscopy was used for the analysis, and the analysis wavelength range was 300 to 1,200 nm.

Subsequently, the same sample was stored at a temperature of 60° C. and a relative humidity of 90% for 72 hours, and the wavelength (or wavelength band) ($A_1$) with the maximum reflectance (minimum transmittance) was recorded in a similar manner. The peak variation, which is the degree of movement of the wavelength with the lowest transmittance before and after evaluation, was measured according to the following Equation 3. At this time, it was assumed that sample deformation (e.g., shrinkage or expansion) did not affect the surface pitch and occurred only in the direction perpendicular to the sample surface.

$$\text{Peak variation} = \{|1 - A_1/A_0|\} \times 100 \qquad \text{[Equation 3]}$$

(5) Refractive Index Variation

In order to evaluate the stability of the hologram recording medium in a high temperature/high humidity environment before recording the diffraction grating, the degree of refractive index change before and after exposing the sample to high temperature/high humidity conditions before recording the diffraction grating was confirmed.

Specifically, the hologram recording media before recording prepared as in Examples and Comparative Examples were stored under constant temperature (20 to 25° C.) and constant humidity (relative humidity of 40 to 50%) conditions, and then bleached with white LED before recording. Samples that were not exposed to a high temperature/high humidity environment were prepared. Then, the refractive index no of the sample was measured using a prism coupler (SPA-3DR, SAIRON TECHNOLOGY).

On the other hand, the hologram recording medium before recording prepared as in Examples and Comparative Examples was stored at a temperature of 60° C. and relative humidity of 90% for 72 hours, bleached with white LED, and samples exposed to a high temperature/high humidity environment before recording were prepared. Then, the refractive index $n_1$ of the sample was measured using a prism coupler.

The refractive index variation was calculated by substituting $n_0$ and $n_1$ into the following Equation 4.

$$\text{Refractive index variation (\%)} = \{|1 - n_1/n_0|\} \times 100 \qquad \text{[Equation 4]}$$

wherein, in Equation 4, no is the refractive index of a sample in which the hologram recording medium before recording is stored at a temperature of 20 to 25° C. and a relative humidity of 40 to 50% and then bleached with a white LED, and $n_1$ is the refractive index of a sample in which the hologram recording medium before recording is stored at a temperature of 60° C. and a relative humidity of 90% for 72 hours and then bleached with a white LED.

TABLE 2

|  | Diffraction efficiency (%) | Refractive index modulation value | Haze (%) | Peak variation (%) | Refractive index variation (%) |
|---|---|---|---|---|---|
| Example 1 | 85 | 0.031 | 0.7 | 1.06 | 0.33 |
| Example 2 | 87 | 0.034 | 0.8 | 1.79 | 0.59 |
| Example 3 | 85 | 0.033 | 0.7 | 1.06 | 0.20 |
| Example 4 | 91 | 0.039 | 1.0 | 1.82 | 0.20 |
| Example 5 | 75 | 0.027 | 0.8 | 1.67 | 0.46 |
| Example 6 | 80 | 0.028 | 0.8 | 1.06 | 0.39 |
| Example 7 | 80 | 0.030 | 0.8 | 1.06 | 0.39 |
| Example 8 | 82 | 0.035 | 1.2 | 1.79 | 0.46 |
| Example 9 | 73 | 0.026 | 0.8 | 1.06 | 0.26 |
| Example 10 | 71 | 0.025 | 0.8 | 1.06 | 0.26 |
| Example 11 | 75 | 0.030 | 1.8 | 1.48 | 0.43 |
| Comparative Example 1 | 85 | 0.033 | 2.1 | 6.52 | 1.83 |
| Comparative Example 2 | 63 | 0.024 | 2.3 | 4.24 | 1.64 |
| Comparative Example 3 | 57 | 0.021 | 3.2 | 3.87 | 1.71 |
| Comparative Example 4 | 37 | 0.013 | 3.6 | 15.7 | 2.30 |

Referring to Table 2, it is confirmed that the hologram recording media prepared in Examples 1 to 11 not only exhibit excellent diffraction efficiency, refractive index modulation value, and low haze, but also exhibit excellent reliability even after exposure to a high temperature/high humidity environment before and after recording. In contrast, the hologram recording media prepared in Comparative Examples 2 to 4 were inferior in optical recording properties, haze, and reliability in high temperature/high humidity environments. And the hologram recording medium prepared in Comparative Example 1 had excellent optical recording properties, but had high haze and exhibited poor reliability in high temperature/high humidity environments before and after recording.

Therefore, it is confirmed that as the holographic recording medium according to one embodiment of the invention includes a fluorinated compound having a specific structure, it has excellent optical recording properties, excellent reliability even in high temperature/high humidity environments, and exhibits high transparency.

The invention claimed is:

1. A hologram recording medium comprising: a photopolymer layer which includes a polymer matrix formed by crosslinking a siloxane-based polymer containing a silane functional group and a (meth)acrylic-based polyol, or a precursor thereof; a photoreactive monomer and a photoinitiator system or a photopolymer obtained therefrom; and a fluorinated compound, wherein a refractive index variation calculated by the following Equation 4 is 1.0% or less, and wherein a haze is 2% or less:

$$\text{Refractive index variation (\%)} = \{|1 - n_1/n_0|\} \times 100 \qquad \text{[Equation 4]}$$

wherein, in the Equation 4, $n_0$ is a refractive index of a sample in which the hologram recording medium before recording is stored at a temperature of 20 to 25° C. and a relative humidity of 40 to 50% and then bleached with a white LED, and $n_1$ is a refractive index of a sample in which the hologram recording medium before recording is stored at a temperature of 60° C. and a relative humidity of 90% for 72 hours and then bleached with a white LED.

2. The hologram recording medium according to claim 1, wherein the siloxane-based polymer comprises a repeating unit represented by the following Chemical Formula 1 and a terminal end group represented by the following Chemical Formula 2:

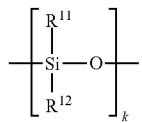

[Chemical Formula 1]

wherein, in the Chemical Formula 1,
a plurality of $R^{11}$ and $R^{12}$ are the same or different from each other, and are each independently hydrogen, halogen, or an alkyl group having 1 to 10 carbon atoms, and k is an integer of 1 to 10,000,

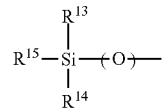

[Chemical Formula 2]

wherein, in the Chemical Formula 2,
a plurality of $R^{13}$ to $R^{15}$ are the same or different from each other, and are each independently hydrogen, halogen, or an alkyl group having 1 to 10 carbon atoms, and
at least one of $R^1$ to $R^{15}$ of at least one repeating unit selected among the repeating units represented by Chemical Formula 1 and any one terminal end group selected among the terminal end groups represented by Chemical Formula 2 is hydrogen.

3. The hologram recording medium according to claim 1, wherein the (meth)acrylic-based polyol is a polymer in which a hydroxy group is bonded to a main chain or side chain of the (meth)acrylate-based polymer.

4. The hologram recording medium according to claim 1, wherein the photoreactive monomer comprises at least one monofunctional monomer selected from the group consisting of benzyl (meth)acrylate, benzyl 2-phenylacrylate, phenoxybenzyl (meth)acrylate, phenol (ethylene oxide) (meth)acrylate, phenol (ethylene oxide)$_2$ (meth)acrylate, O-phenylphenol (ethylene oxide) (meth)acrylate, phenylthioethyl (meth)acrylate and biphenylmethyl (meth)acrylate; at least one polyfunctional monomer selected from the group consisting of bisphenol A (ethylene oxide)$_{2~10}$ di(meth)acrylate, bisphenol A epoxy di(meth)acrylate, bisfluorene di(meth)acrylate, modified bisphenol fluorene di(meth)acrylate, tris(2-hydroxyethyl)isocyanurate tri(meth)acrylate, phenol novolac epoxy (meth)acrylate and cresol novolac epoxy (meth)acrylate; or a mixture of two or more thereof.

5. The hologram recording medium according to claim 1, wherein the photoinitiator system comprises a photosensitizing dye and a coinitiator.

6. The hologram recording medium according to claim 5, wherein the coinitiator comprises a borate anion represented by the following Chemical Formula 3:

[Chemical Formula 3]

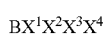

wherein, in the Chemical Formula 3,
$X^1$ to $X^4$ are each independently an alkyl group having 1 to 20 carbon atoms, an alkenyl group having 2 to 20 carbon atoms, an aryl group having 6 to 30 carbon atoms, an arylalkyl group having 7 to 30 carbon atoms, an alkylaryl group having 7 to 30 carbon atoms, or an allyl group, each of which is substituted or unsubstituted, with the proviso that at least one of $X^1$ to $X^4$ is not an aryl group.

7. The hologram recording medium according to claim 1, wherein the fluorinated compound comprises a fluorinated compound represented by the following Chemical Formula 4:

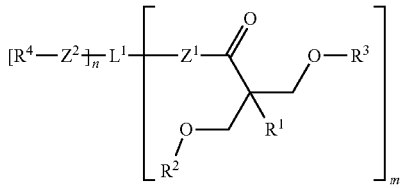

[Chemical Formula 4]

in the Chemical Formula 4,
$Z^1$ is —O— or —NH—,
$Z^2$ is a single bond, —O— or —NH—,
$L^1$ is a single bond or a divalent to hexavalent organic group in which hydroxy groups have been removed from a polyol having 2 to 6 hydroxyl groups,
n and m are each independently an integer of 1 to 5, wherein the sum of n and m is 2 to 6,
$R^1$ is a methyl group or an ethyl group, and
at least one of $R^2$ to $R^4$ is a fluorine-containing substituent, which is an alkyl group having 1 to 20 carbon atoms substituted with 2 or more fluorines, a cycloalkyl group having 3 to 30 carbon atoms substituted with 2 or more fluorines, or an aryl group having 6 to 30 carbon atoms substituted with 2 or more fluorines,
wherein, when $R^2$ and $R^3$ are not fluorine-containing substituents, $R^2$ and $R^3$ are each independently hydrogen, an alkyl group having 1 to 20 carbon atoms, a cycloalkyl group having 3 to 30 carbon atoms, a heterocycloalkyl group having 4 to 30 carbon atoms, a cycloalkylalkyl group having 7 to 40 carbon atoms, an aryl group having 6 to 30 carbon atoms, a heteroaryl group having 4 to 30 carbon atoms or an arylalkyl group having 7 to 40 carbon atoms, or a substituent in which at least one —CH$_2$— of the substituents is substituted with —O—, —S— or —NH—, and
when $R^4$ is not a fluorine-containing substituent, $R^4$ is an alkyl group having 2 to 20 carbon atoms, a cycloalkyl group having 3 to 30 carbon atoms, a cycloalkylalkyl group having 7 to 40 carbon atoms, an aryl group having 6 to 30 carbon atoms, a heteroaryl group having 4 to 30 carbon atoms or an arylalkyl group having 7 to 40 carbon atoms, or is a substituent in which at least one —CH$_2$— of the substituent is substituted with —O—, —S—, or —NH—.

8. The hologram recording medium according to claim 7, wherein $L^1$ in the Chemical Formula 4 is a single bond; or a trivalent organic group in which hydroxy groups have been removed from a glycerol which is a triol.

9. The hologram recording medium according to claim 7, wherein the fluorine-containing substituent is a straight chain alkyl group having 1 to 20 carbon atoms substituted with 2 or more fluorines.

10. The hologram recording medium according to claim 7, wherein the fluorine-containing substituent is —$(CH_2)_a(CF_2)_bCHF_2$ or —$(CH_2)_a(CF_2)_bCF_3$, where a is an integer of 0 to 3, and b is an integer of 0 to 19.

11. The hologram recording medium according to claim 7, wherein when $R^2$ and $R^3$ in the Chemical Formula 4 are not fluorine-containing substituents, $R^2$ and $R^3$ are each independently hydrogen, a straight chain alkyl group having 1 to 6 carbon atoms, a cycloalkyl group having 3 to 10 carbon atoms, a heterocycloalkyl group having 4 to 12 carbon atoms, an aryl group having 6 to 14 carbon atoms or —$(R^5—O)_p—R^6$, where $R^5$ is an alkylene group having 1 to 6 carbon atoms, $R^6$ is an alkyl group having 1 to 6 carbon atoms, and p is an integer of 1 to 12.

12. The hologram recording medium according to claim 7, wherein when $R^4$ in the Chemical Formula 4 is not a fluorine-containing substituent, $R^4$ is a straight chain alkyl group having 2 to 6 carbon atoms, a cycloalkyl group having 3 to 10 carbon atoms, an aryl group having 6 to 14 carbon atoms or —$(R^5—O)_p—R^6$, where $R^5$ is an alkylene group having 1 to 6 carbon atoms, $R^6$ is an alkyl group having 1 to 6 carbon atoms, and p is an integer of 1 to 12.

13. The hologram recording medium according to claim 7, wherein the fluorinated compound represented by the Chemical Formula 4 comprises at least one fluorinated compound selected from the group consisting of fluorinated compounds represented by the following Chemical Formulas 4-1-1 to 4-1-5 and the following Chemical Formulas 4-2-1 to 4-2-5:

[Chemical Formula 4-1-1]

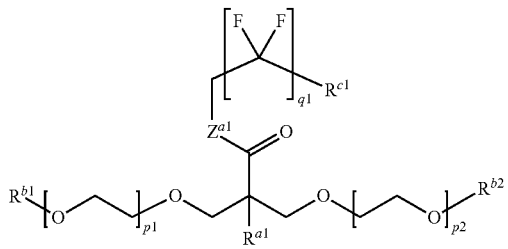

wherein, in the Chemical Formula 4-1-1,
$R^{a1}$ is a methyl group or an ethyl group,
$R^{b1}$ and $R^{b2}$ are each independently hydrogen or an alkyl group having 1 to 4 carbon atoms,
$R^{c1}$ is $CF_3$ or $CHF_2$,
$Z^{a1}$ is —O— or —NH—,
p1 and p2 are each independently an integer of 0 to 3, and
q1 is an integer of 0 to 9,

[Chemical Formula 4-1-2]

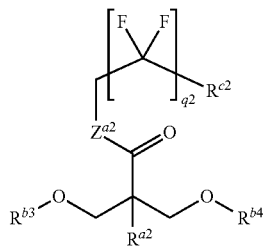

wherein, in the Chemical Formula 4-1-2,
$R^{a2}$ is a methyl group or an ethyl group,
$R^{b3}$ and $R^{b4}$ are each independently a cyclohexyl group, a tetrahydropyranyl group, or a phenyl group,
$R^{c2}$ is $CF_3$ or $CHF_2$,
$Z^{a2}$ is —O— or —NH—, and
q2 is an integer of 0 to 9,

[Chemical Formula 4-1-3]

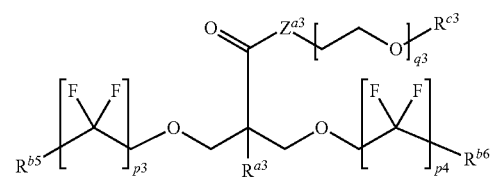

wherein, in the Chemical Formula 4-1-3,
$R^{a3}$ is a methyl group or an ethyl group,
$R^{b5}$ and $R^{b6}$ are each independently $CF_3$ or $CHF_2$,
$R^{c3}$ is an alkyl group having 1 to 4 carbon atoms,
$Z^{a3}$ is —O— or —NH—,
p3 and p4 are each independently an integer of 0 to 9, and
q3 is an integer of 0 to 3,

[Chemical Formula 4-1-4]

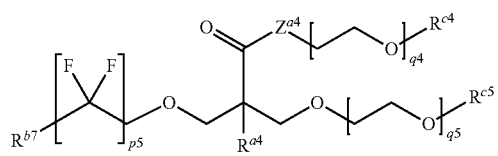

wherein, in the Chemical Formula 4-1-4,
$R^{a4}$ is a methyl group or an ethyl group,
$R^{b7}$ is $CF_3$ or $CHF_2$,
$R^{c4}$ and $R^{c5}$ are each independently an alkyl group having 1 to 4 carbon atoms,
$Z^{a4}$ is —O— or —NH—,
p5 is an integer of 0 to 9, and
q4 and q5 are each independently an integer of 0 to 3,

[Chemical Formula 4-1-5]

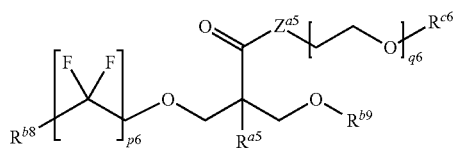

wherein, in the Chemical Formula 4-1-5,
$R^{a5}$ is a methyl group or an ethyl group,
$R^{b8}$ is $CF_3$ or $CHF_2$,
$R^{b9}$ is a cyclohexyl group, a tetrahydropyranyl group, or a phenyl group,
$R^{c6}$ is an alkyl group having 1 to 4 carbon atoms,
$Z^{a5}$ is —O— or —NH—,
p6 is an integer of 0 to 9, and
q6 is an integer of 0 to 3,

[Chemical Formula 4-2-1]

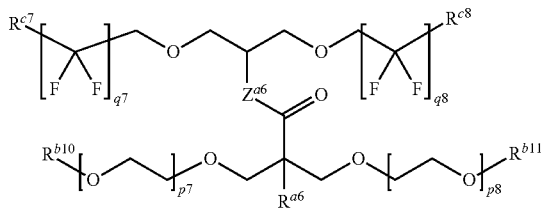

wherein, in the Chemical Formula 4-2-1,
$R^{a6}$ is a methyl group or an ethyl group,
$R^{b10}$ and $R^{b11}$ are each independently hydrogen or an alkyl group having 1 to 4 carbon atoms,
$R^{c7}$ and $R^{c8}$ are each independently $CF_3$ or $CHF_2$,
$Z^{a6}$ is —O— or —NH—,
p7 and p8 are each independently an integer of 0 to 3, and
q7 and q8 are each independently an integer of 0 to 9,

[Chemical Formula 4-2-2]

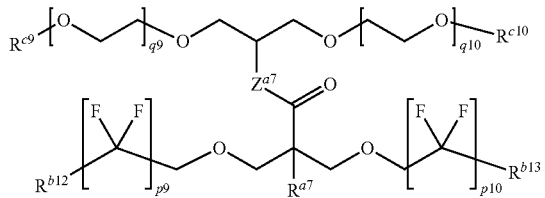

wherein, in the Chemical Formula 4-2-2,
$R^{a7}$ is a methyl group or an ethyl group,
$R^{b12}$ and $R^{b13}$ are each independently $CF_3$ or $CHF_2$,
$R^{c9}$ and $R^{c10}$ are each independently an alkyl group having 1 to 4 carbon atoms,
$Z^{a7}$ is —O— or —NH—,
p9 and p10 are each independently an integer of 0 to 9, and
q9 and q10 are each independently an integer of 0 to 3,

[Chemical Formula 4-2-3]

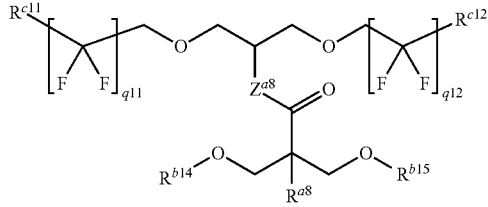

wherein, in the Chemical Formula 4-2-3,
$R^{a8}$ is a methyl group or an ethyl group,
$R^{b14}$ and $R^{b15}$ are each independently a cyclohexyl group, a tetrahydropyranyl group, or a phenyl group,
$R^{c11}$ and $R^{12}$ are each independently $CF_3$ or $CHF_2$,
$Z^{a8}$ is —O— or —NH—, and
q11 and q12 are each independently an integer of 0 to 9,

[Chemical Formula 4-2-4]

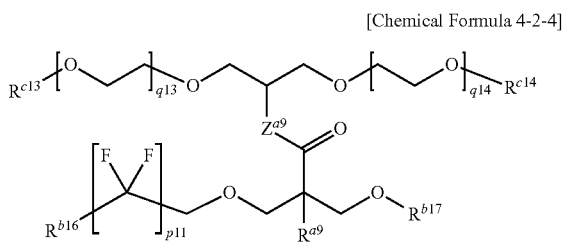

wherein, in the Chemical Formula 4-2-4,
$R^{a9}$ is a methyl group or an ethyl group,
$R^{b16}$ is $CF_3$ or $CHF_2$,
$R^{b17}$ is a cyclohexyl group, a tetrahydropyranyl group, or a phenyl group,
$R^{c13}$ and $R^{14}$ are each independently an alkyl group having 1 to 4 carbon atoms,
$Z^{a9}$ is —O— or —NH—,
p11 is an integer of 0 to 9, and
q13 and q14 are each independently an integer of 0 to 3,

[Chemical Formula 4-2-5]

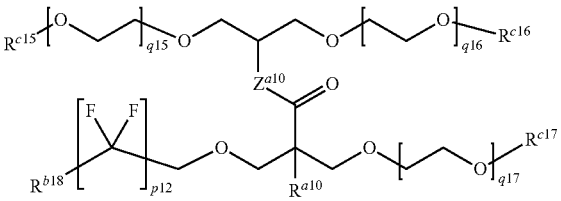

wherein, in the Chemical Formula 4-2-5,
$R^{a10}$ is a methyl group or an ethyl group,
$R^{b18}$ is $CF_3$ or $CHF_2$,
$R^{c15}$ to $R^{c17}$ are each independently an alkyl group having 1 to 4 carbon atoms,
$Z^{a10}$ is —O— or —NH—,
p12 is an integer of 0 to 9, and
q15 to q17 are each independently an integer of 0 to 3.

14. The hologram recording medium according to claim 1, wherein an amount of the fluorinated compound is 20 to 200 parts by weight based on 100 parts by weight of the polymer matrix.

15. The hologram recording medium according to claim 1, wherein when recording a notch filter hologram, a diffraction efficiency is at least 70%.

16. The hologram recording medium according to claim 1, wherein the photopolymer layer has a thickness of 5 to 30 μm and a refractive index modulation value of 0.020 or more.

17. An optical element comprising the hologram recording medium according to claim 1.

* * * * *